United States Patent
Koh et al.

(10) Patent No.: US 12,151,740 B2
(45) Date of Patent: Nov. 26, 2024

(54) DYNAMIC AUTOSTEERING DISENGAGEMENT

(71) Applicant: Rivian IP Holdings, LLC, Plymouth, MI (US)

(72) Inventors: Kok Wei Koh, Mountain View, CA (US); Rohan Kulkarni, Mountain View, CA (US); Saba Gurusubramanian, Mountain View, CA (US)

(73) Assignee: Rivian IP Holdings. LLC, Irvine, CA (US)

( * ) Notice: Subject to any disclaimer, the term of this patent is extended or adjusted under 35 U.S.C. 154(b) by 323 days.

(21) Appl. No.: 17/386,626

(22) Filed: Jul. 28, 2021

(65) Prior Publication Data

US 2023/0033338 A1    Feb. 2, 2023

(51) Int. Cl.
 *B62D 15/02* (2006.01)
 *B60W 30/10* (2006.01)
 *B62D 6/00* (2006.01)

(52) U.S. Cl.
 CPC .......... *B62D 15/025* (2013.01); *B60W 30/10* (2013.01); *B62D 6/007* (2013.01); *B60W 2510/202* (2013.01); *B60W 2540/18* (2013.01)

(58) Field of Classification Search
 CPC ...... B62D 15/025; B62D 6/007; B62D 1/286; B60W 30/10; B60W 2510/202; B60W 2540/18
 USPC .......................................................... 701/41
 See application file for complete search history.

(56) References Cited

U.S. PATENT DOCUMENTS

| | | | |
|---|---|---|---|
| 2002/0177935 A1* | 11/2002 | Winner | B60K 31/0008 180/170 |
| 2004/0262063 A1* | 12/2004 | Kaufmann | B62D 15/025 180/169 |
| 2009/0216404 A1* | 8/2009 | Maass | B62D 15/025 701/41 |
| 2019/0047621 A1* | 2/2019 | Kim | B62D 15/025 |
| 2019/0071081 A1* | 3/2019 | Katayama | B60W 30/18163 |
| 2021/0197813 A1* | 7/2021 | Houston | B60W 30/143 |

FOREIGN PATENT DOCUMENTS

| | | |
|---|---|---|
| DE | 112017000550 T5 | 10/2018 |
| DE | 112016005745 T5 | 11/2018 |
| DE | 112018003470 T5 | 3/2020 |
| DE | 102022114511 A1 | 12/2022 |
| DE | 102022109372 A1 | 1/2023 |

* cited by examiner

*Primary Examiner* — Scott A Reinbold
(74) *Attorney, Agent, or Firm* — BAKERHOSTETLER

(57) ABSTRACT

Disclosed embodiments include systems, vehicles, and computer-implemented methods to adjust a threshold level of force to be applied to a steering wheel to disengage an autosteering system. In an illustrative embodiment, a system includes a computing device operably coupled with a vehicle that includes a processor and a computer-readable media configured to store computer-executable instructions configured to cause the processor to: detect that an autosteering system of the vehicle is engaged; detect a level of force applied by an operator to a steering wheel of the vehicle; and disengage the autosteering system when the level of force surpasses a threshold chosen from a default threshold and an adjusted threshold, wherein the adjusted threshold is applied upon detecting a predetermined condition.

16 Claims, 21 Drawing Sheets

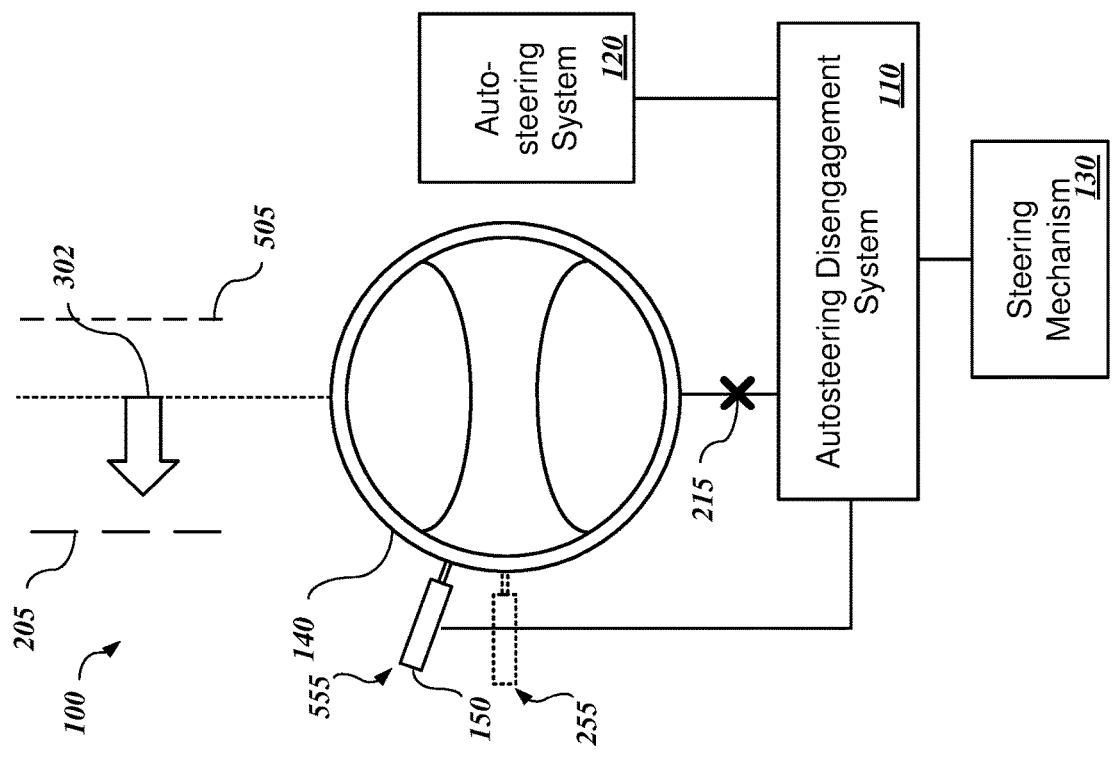
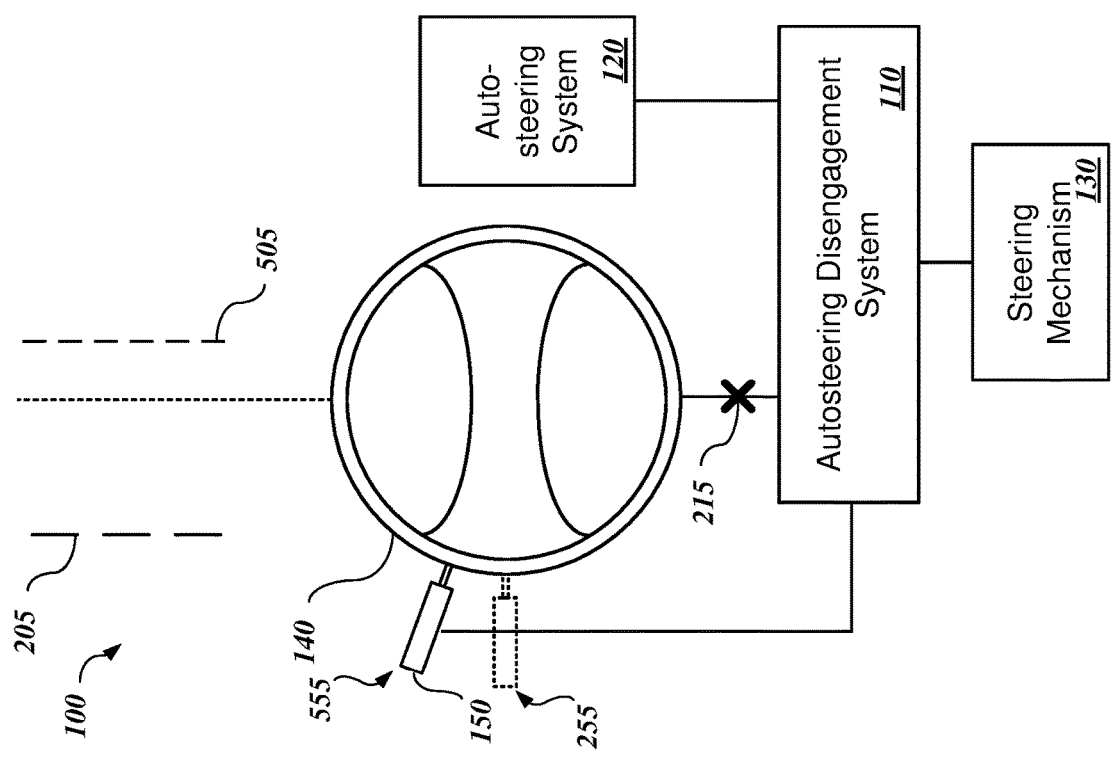

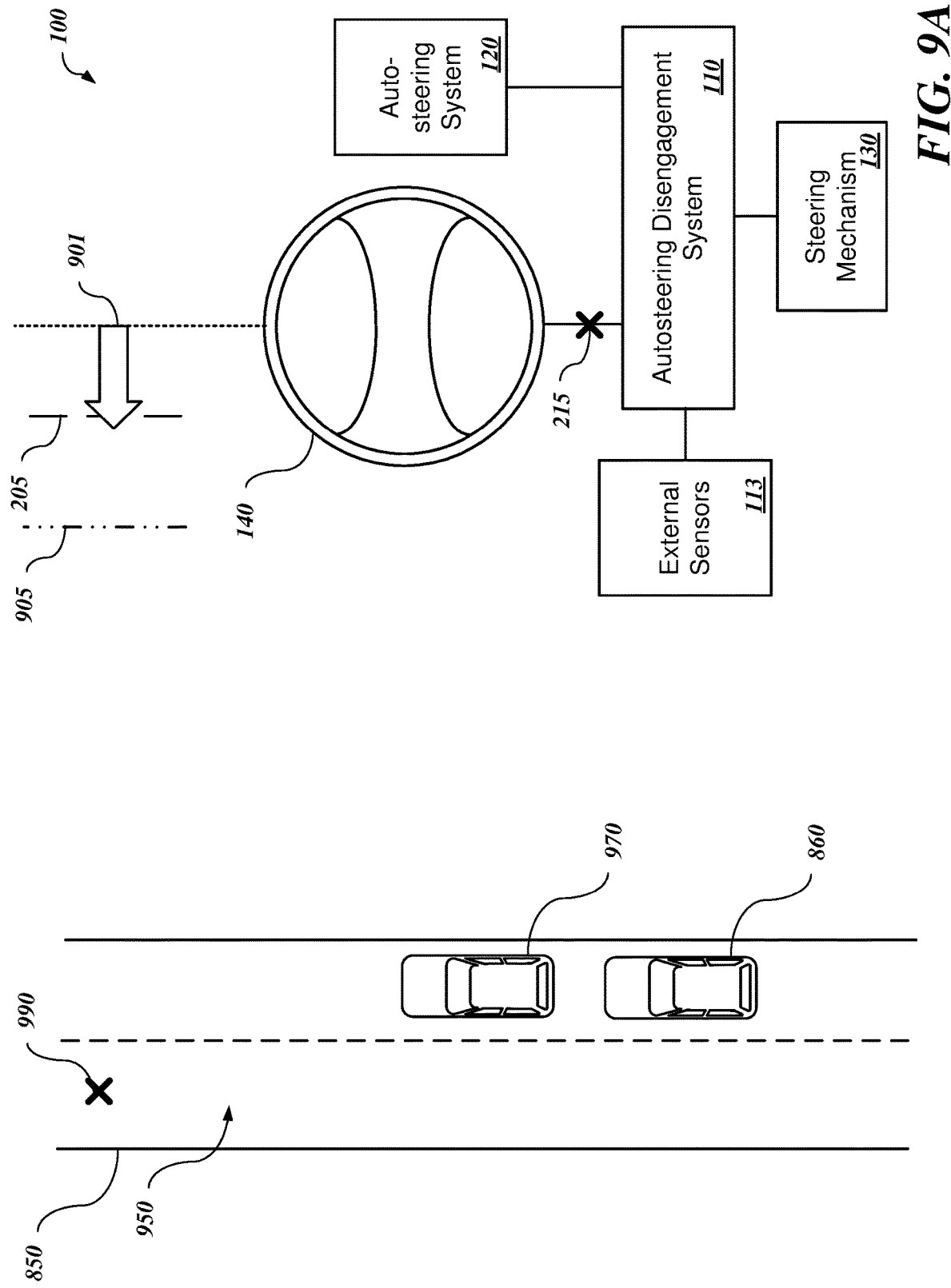

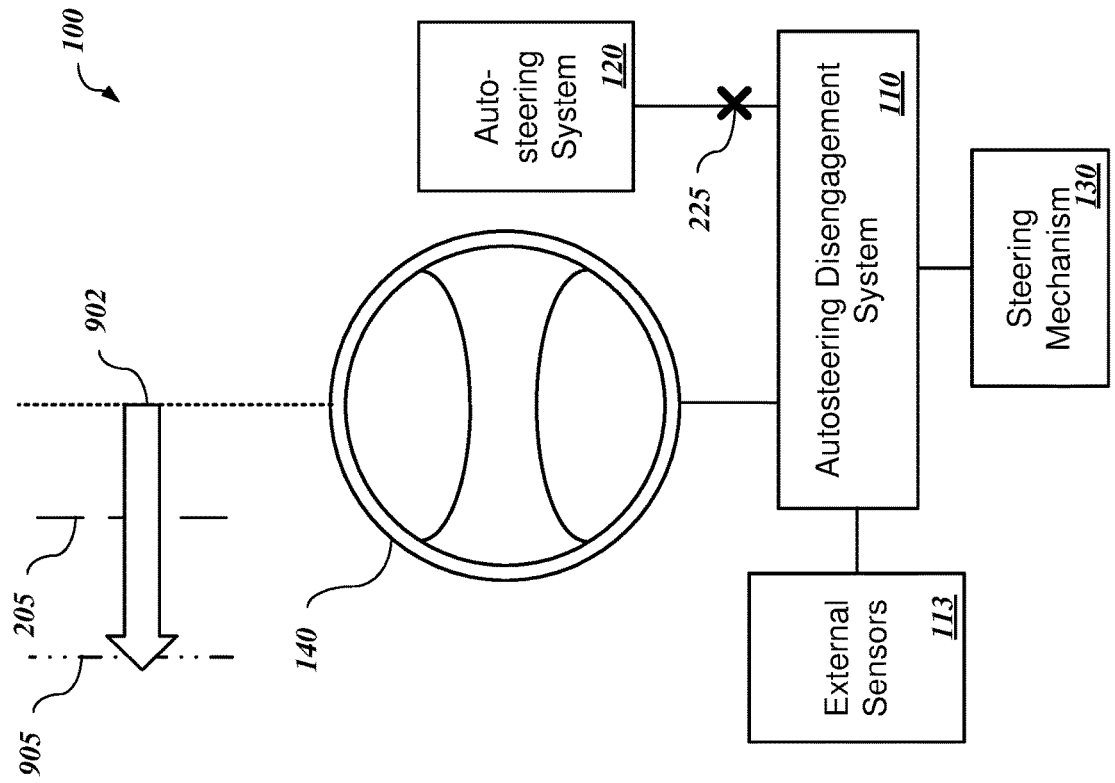
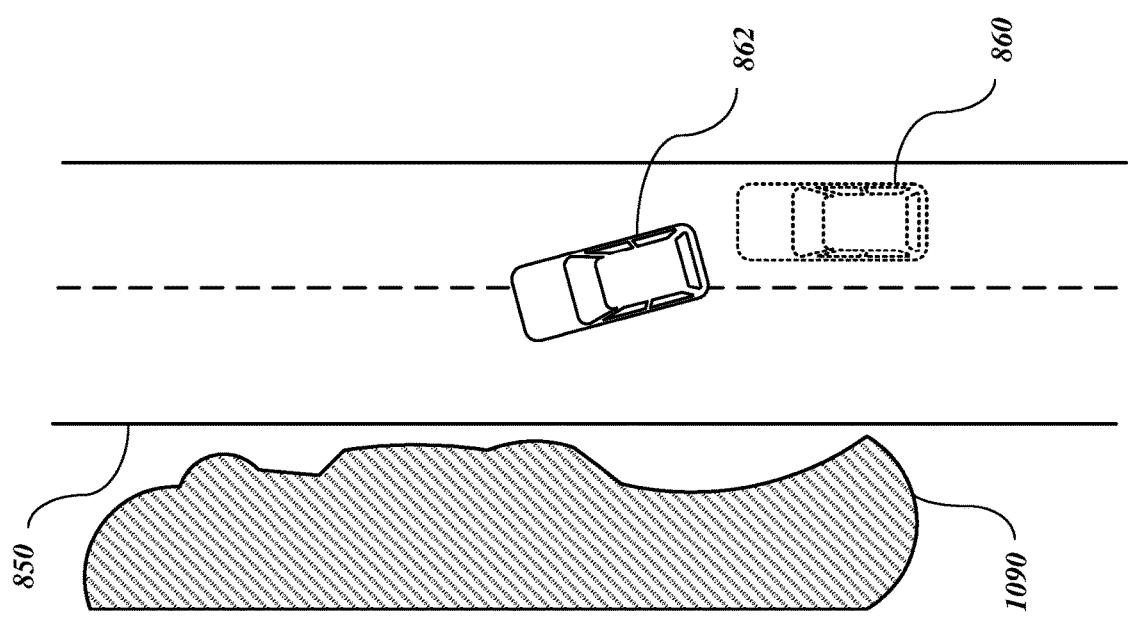
FIG. 10B

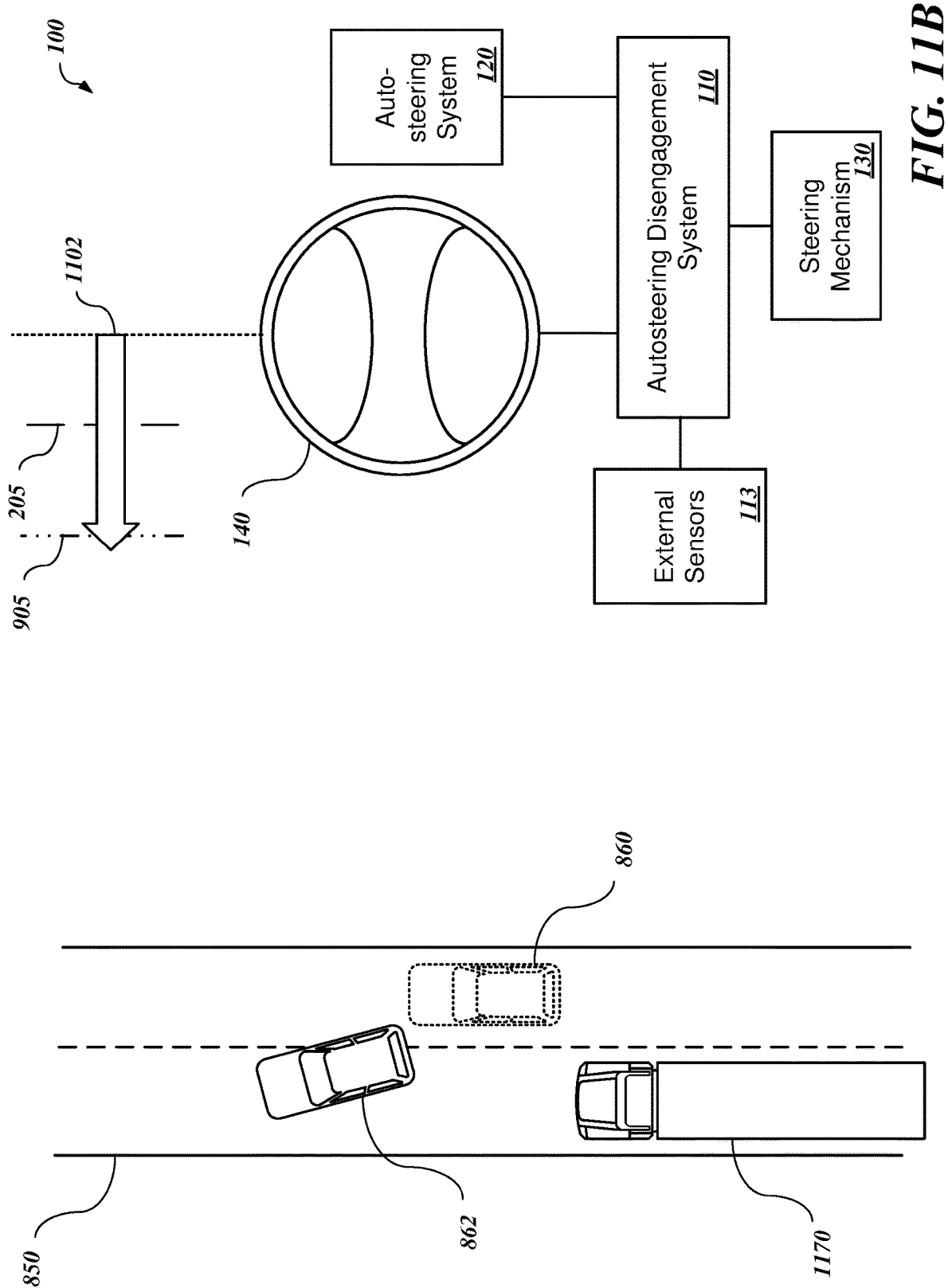

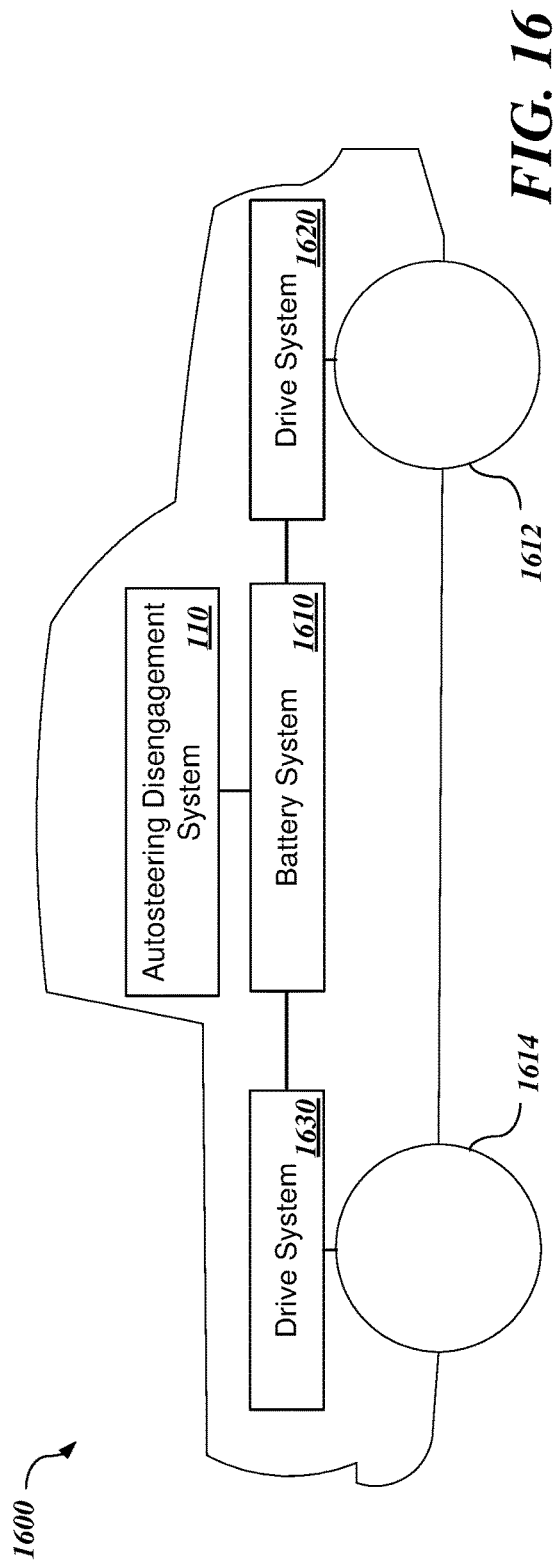
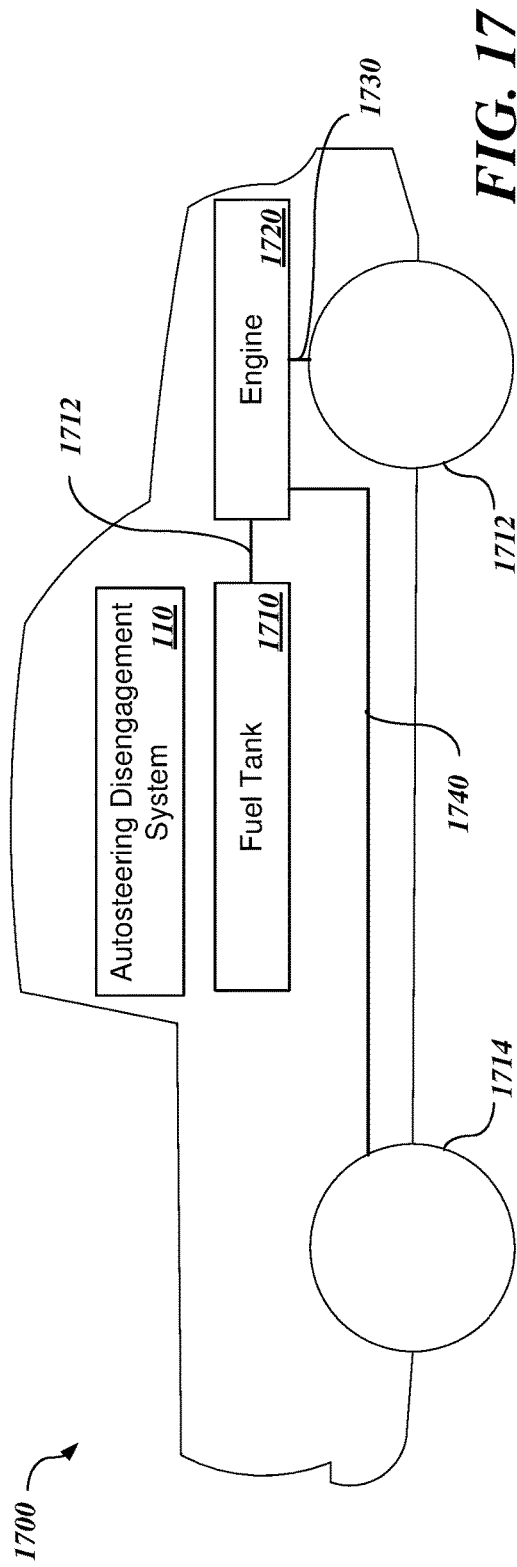

DYNAMIC AUTOSTEERING DISENGAGEMENT

INTRODUCTION

Vehicle autosteering systems may provide convenience for drivers by autonomously steering vehicles or providing lane-keeping assistance. In many vehicle autosteering systems the operator can retake manual steering control by providing a signal to disengage the vehicle autosteer system. However, in some vehicle autosteering systems, the operator may signal to disengage the vehicle autosteer system by providing a signal that is inadvertent or incidental.

SUMMARY

Disclosed embodiments include systems, vehicles, and computer-implemented methods to adjust a threshold level of force to be applied to a steering wheel to disengage an autosteering system.

In an illustrative embodiment, a system includes a computing device operably coupled with a vehicle that includes a processor and a computer-readable media configured to store computer-executable instructions configured to cause the processor to: detect that an autosteering system of the vehicle is engaged; detect a level of force applied by an operator to a steering wheel of the vehicle; and disengage the autosteering system when the level of force surpasses a threshold chosen from a default threshold and an adjusted threshold, wherein the adjusted threshold is applied upon detecting a predetermined condition.

In another illustrative embodiment, a vehicle includes a cabin, a drive system, and a computing device operably coupled with the vehicle that includes a processor and a computer-readable media configured to store computer-executable instructions configured to cause the processor to: detect that an autosteering system of the vehicle is engaged; detect a level of force applied by an operator to a steering wheel of the vehicle; and disengage the autosteering system when the level of force surpasses a threshold chosen from a default threshold and an adjusted threshold, wherein the adjusted threshold is applied upon detecting a predetermined condition.

In another illustrative embodiment, a computer-implemented method includes: detecting that an autosteering system of the vehicle is engaged; detecting a level of force applied by an operator to a steering wheel of the vehicle; and disengaging the autosteering system when the level of force surpasses a threshold chosen from a default threshold and an adjusted threshold, wherein the adjusted threshold is applied upon detecting a predetermined condition.

Further features, advantages, and areas of applicability will become apparent from the description provided herein. It will be appreciated that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings:

FIG. 1 is a block diagram of an illustrative autosteering disengagement system;

FIGS. 2A and 2B, 3A and 3B, 5A and 5B, 6A and 6B, and 7A and 7B are schematic diagrams of a response of the autosteering disengagement system of FIG. 1 to an operator's actions;

FIG. 4 is a schematic diagram representing different vehicle maneuvers resulting from use of the autosteering disengagement system of FIG. 1;

FIGS. 8A and 8B, 9A and 9B, 10A and 10B, and 11A and 11B, are schematic diagrams of a response of the autosteering disengagement system of FIG. 1 to an external condition;

FIGS. 15-17 are block diagrams in partial schematic form of vehicles equipped with the autosteering disengagement system of FIG. 1;

DETAILED DESCRIPTION

The following description explains, by way of illustration only and not of limitation, various embodiments.

By way of a non-limiting introduction and overview, embodiments include systems (which may be incorporated in a vehicle) and computer-implemented methods to adjust a threshold level of force to be applied to a steering wheel to disengage an autosteering system. In an illustrative embodiment, a system includes a computing device operably coupled with a vehicle that includes a processor and a computer-readable media configured to store computer-executable instructions configured to cause the processor to detect that an autosteering system is engaged. The system is further configured to detect a level of force applied by an operator to a steering wheel of the vehicle. The system is configured to disengage the autosteering system when the level of force surpasses a threshold chosen from a default threshold and an adjusted threshold, wherein the adjusted threshold is applied upon detecting a predetermined condition.

As further described below, the adjusted threshold may dictate the application of a lower level of force in response to the operator engaging a release input to signal that the operator intends to turn the vehicle. On the other hand, the adjusted threshold may dictate the application of a higher level of force when an external condition is detected, such as the presence of an obstacle, unsafe condition, or another vehicle on at least one side of the vehicle to make even more certain that the operator intends to turn the vehicle when such external conditions arise. Now that a general overview has been given, details of various embodiments will be explained by way of non-limiting examples given by way of illustration only and not of limitation.

Figure 1:
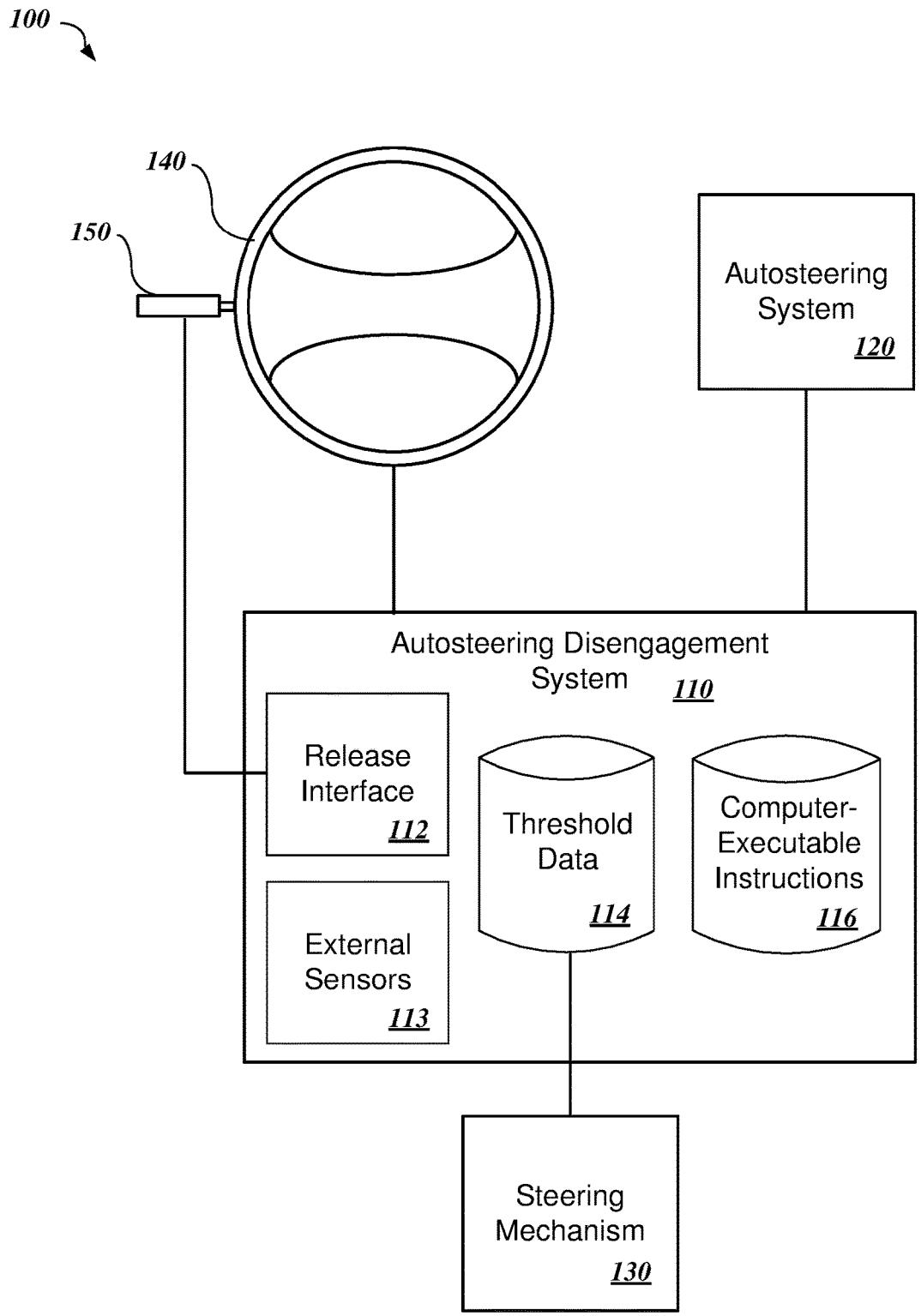

Referring to FIG. 1, an illustrative system 100 includes an autosteering disengagement system 110 configured to selectively disengage an autosteering system 120 from a steering mechanism 130 of a vehicle. Autosteering system 120 may, for example, autonomously steer a vehicle or provide lane-keeping assistance to prevent operators from inadvertently drifting from their lanes. The autosteering disengagement system 110 is in communication with a manual steering apparatus, such as a steering wheel 140. The autosteering disengagement system 110 is in communication with a turn signal 150 or other release input used by the autosteering disengagement system 110 to verify an operator's intention to disengage the autosteering system 120, as described further below.

The autosteering disengagement system 110 also may be in communication with external sensors 113 that are configured to enable the autosteering disengagement system 110 and one or more associated processors, as described below, to detect a predetermined condition in the form of one or more conditions outside of the vehicle. The external sensors 113 may include a global positioning system ("GPS")/geolocation system that determined the position of the vehicle and compares the position to map data that may indicate potentially dangerous conditions along the road being traveled, such as blind turns, steep drop-offs, or lane closures. Some such systems also receive real-time data about traffic, construction, and vehicle breakdowns that may recreate dangerous conditions along the road being travelled. Other external sensors 113 may include proximity sensors, such as optical sensors, sonar, radar, lidar, ultrasonic sensors, or other devices, that may detect objects within a predetermined range of the vehicle, such as the presence of other vehicles in a "blind spot" relative to the operator or otherwise near to the vehicle.

The autosteering disengagement system 110 may include a computing device with a processor, memory, storage, and other devices, as further described below with reference to FIG. 18. The memory and/or storage of the autosteering disengagement system 110 maintains threshold data 114 relating to a level of force to be applied to the steering wheel 112 to disengage the autosteering system 120 and computer-executable instructions 116 to cause the autosteering disengagement system 110 to perform functions herein described. The autosteering disengagement system 110 may also include a release interface 112 operably coupled with the turn signal 150 and/or one or more other or additional release inputs that are used by the autosteering disengagement system 110 to determine the operator's intent to disengage the autosteering disengagement system 110.

As mentioned above, in various embodiments the autosteering system 120 may enable an operator to take manual control of the steering mechanism 130 by applying a specified level of force to the steering wheel 140. A default threshold may determine the specified level of force recognized by the autosteering disengagement system 110 to disengage the autosteering system 120. In various embodiments, the autosteering system 120 may apply a countervailing force to the steering wheel 140 until a force applied by the operator surpasses the threshold level of force to disengage the autosteering system 120. The autosteering system 120 thus may include a motor or other motivator to apply the countervailing force to the steering wheel 140 until a force applied by the operator surpasses the threshold level of force to disengage the autosteering system 120. However, according to various embodiments, by engaging the turn signal 150 and/or another release input as described below, the threshold level of force to disengage the autosteering system 120 may be reduced from the default threshold to an adjusted threshold (e.g., by a processor of the autosteering disengagement system 110 detecting the predetermined condition of an engaged turn signal 150 and/or other release input as described below). Thus, the combination of engaging the turn signal 150 and/or another release input combined with a level of force applied to the steering wheel 140 in excess of another specified threshold verifies the operator's intent to disengage the autosteering system 120 while reducing speed or avoiding an abrupt steering maneuver, as further described below with reference to FIGS. 2A-7B. In addition, or according to other embodiments, when the external sensors 113 detect a hazard on at least one side of the vehicle, the autosteering disengagement system 110 may increase the threshold level of force to disengage the autosteering system 120 from the default threshold to a higher, adjusted threshold (e.g., a processor of the autosteering disengagement system 110 detecting the predetermined condition of the presence of a hazard). In such cases where a hazard is present, the autosteering disengagement system 110 may dictate a higher threshold level of force to further ensure the operator intends to take manual control in light of the hazard, as further described below with reference to FIGS. 8A-11B.

Figure 2B:
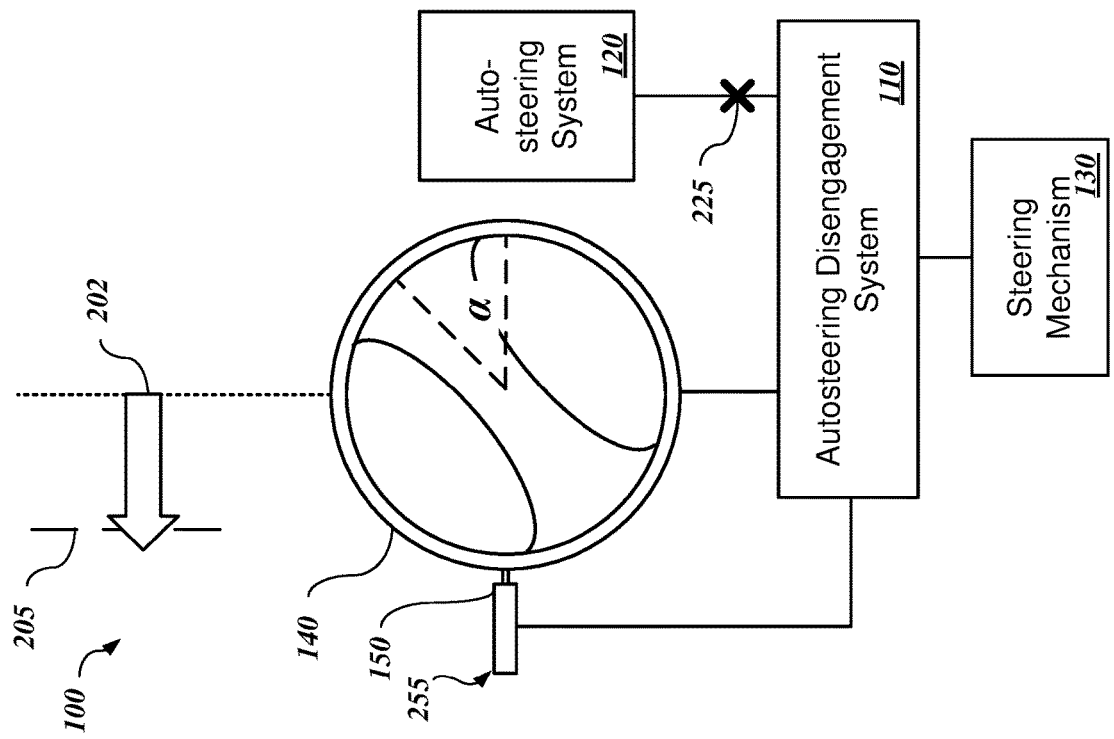
Figure 2A:
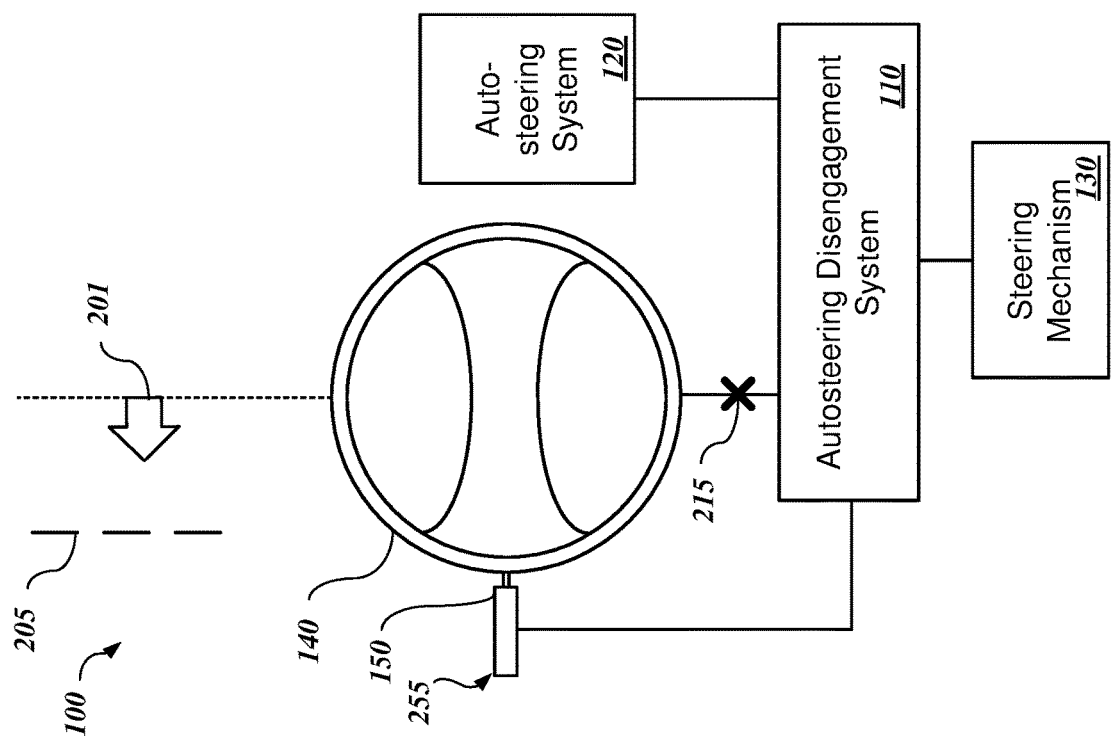

With reference to FIGS. 2A and 2B, 3A and 3B, 5A and 5B, 6A and 6B, 7A and 7B, 8A and 8B, 9A and 9B, 10A and 10B, and 11A and 11B, a level of force applied to the steering wheel 140 is represented with an arrow (e.g., 201 in FIG. 2A). It will be appreciated that the arrow is representative of a force applied to a portion of the steering wheel 140 that acts as a moment arm such that the force represented by the arrow results in a rotational force applied to the steering wheel 140. The length of the respective arrows are representative of the relative level of force applied by the operator to the steering wheel 140. Threshold levels of force required to disengage the autosteering system 120 are represented by dashed lines (e.g., 205 in FIG. 2A). Thus, when the arrow representing the applied force extends across a particular threshold to disengage the autosteering system 120, the force applied surpasses the respective threshold. By contrast, when the arrow does not extend beyond the respective threshold, the autosteering system 120 is not disengaged. The threshold level of force to disengage the autosteering system 120 without first engaging the turn signal 150 or other release input is designated as the default threshold. The autosteering disengagement system 110 may reduce the threshold level of force dictated by the default threshold to a lower, adjusted threshold when the release input has been engaged.

Whether the autosteering system 120 or manual steering (as represented by the steering wheel) controls the steering mechanism 130 is represented by an "X" (e.g., 215 of FIG. 2A) indicating disengagement of the other steering system. Further, in the examples of FIGS. 2A and 2B, 3A and 3B, 5A and 5B, 6A and 6B, and 7A and 7B, the turn signal 150 represents the release input to reduce the threshold level of force to disengage the autosteering system 120. However, as further described below, in various embodiments the turn signal 150 is not the only release input that may be used with embodiments of the autosteering disengagement system 110. Finally, although the operator is not pictured, it will be appreciated that forces represented by the arrows signify forces applied to the steering wheel 140 by an operator of the vehicle.

Referring additionally to FIG. 2A, a force 201 is applied to the steering wheel 140. The turn signal 150 remains at its starting position 255, thus, the release input has not been engaged. Because the turn signal 150 has not been engaged, no adjusted threshold is applied that might provide for disengaging the autosteering system 120 with application of a lesser level of force than imposed by a default threshold 205. The force 201 applied is short of the default threshold 205 to disengage the autosteering system 120. As a result, the autosteering system 120 remains engaged because the force 201 applied to the steering wheel 140 is not sufficient to engage the manual steering system, as represented by the X 215 indicating that the steering wheel 140 is not controlling the steering mechanism 130.

Referring additionally to FIG. 2B, a force 202, larger than the force 201 (FIG. 2A) is applied to the steering wheel 140. Again, the turn signal 150 remains at its starting position 255, thus, the release input has not been engaged, and no adjusted threshold is applied that might provide for disengaging the autosteering system 120 with application of a lesser level of force than imposed by the default threshold 205. By contrast with FIG. 2A, the force 202 surpasses the default threshold 205. Thus, the autosteering system 120 is disengaged, as represented by the X 225 indicating that the autosteering system 120 is disengaged from the steering mechanism 130. The force 202 applied to the steering wheel 140, when it overcomes the default threshold 205, may result in the steering wheel 140 being turned through an angle $\alpha$. Thus, in various embodiments, the autosteering disengagement system 110 enables disengagement of the autosteering system 120 without using a release input such as the turn signal 150.

Figure 3B:
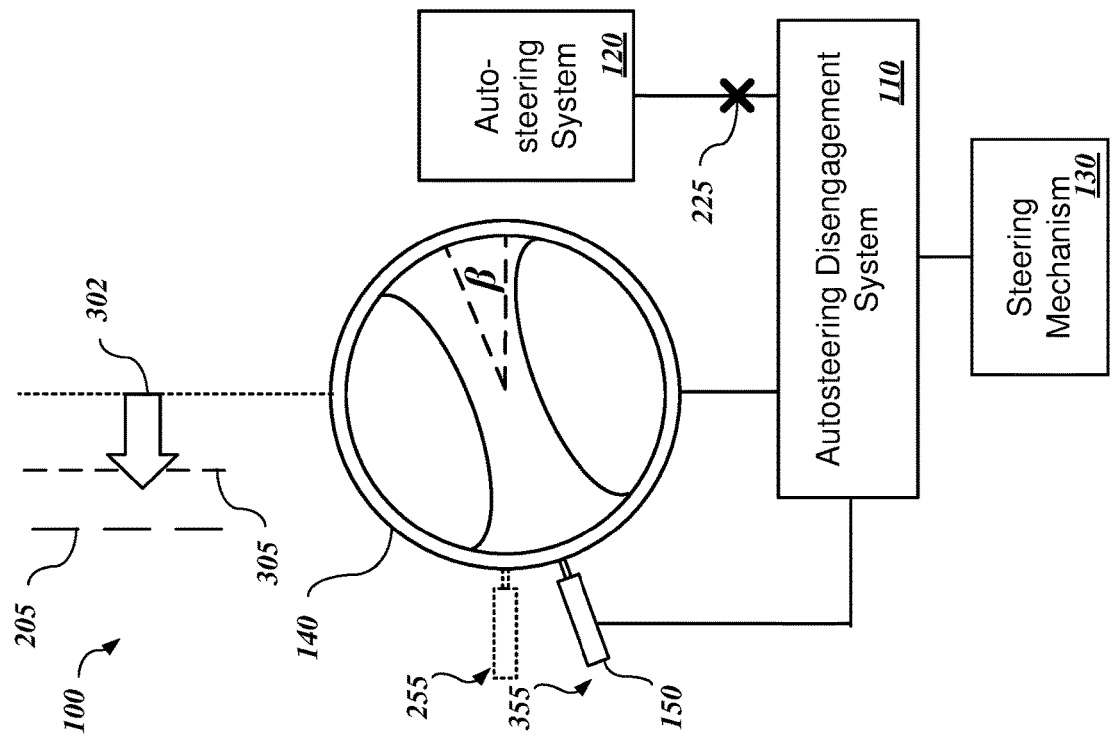
Figure 3A:
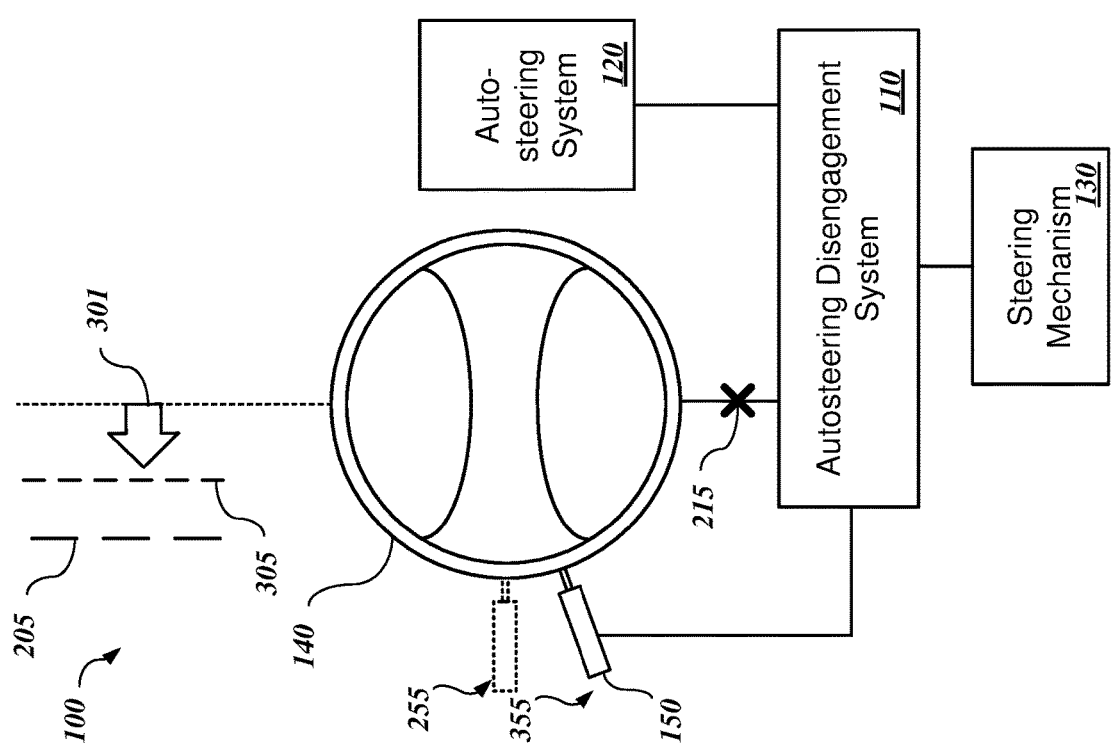

Referring additionally to FIGS. 3A and 3B, as shown in FIG. 3A the turn signal 150 is moved from a starting position 255 to an active position 355 which, in the example of FIGS. 3A and 3B, includes a left-turn position. An adjusted threshold 305 (e.g., a threshold lower than default threshold 205) is applied as a result of the operator engaging the release input in the form of the turn signal 150 (e.g., as a result of a processor detecting the predetermined condition of the operator engaging the release input). A force 301 is applied to the steering wheel 140. However, the force 301 does not meet the adjusted threshold 305 or the default threshold 205, thus, the autosteering system 120 remains engaged.

As shown in FIG. 3B, a force 302 larger than the force 301 (FIG. 3A) is applied to the steering wheel 140. Because the turn signal 150 was moved from its starting position 255 to the active position 355, the release input has been engaged, the adjusted threshold 305 is applied, and the force 302 surpasses the adjusted threshold 305. As a result, the autosteering system 120 is disengaged, as represented by the X 225 indicating that the autosteering system 120 is disengaged from the steering mechanism 130. The force 302 applied to the steering wheel 140, when it overcomes the adjusted threshold 305, may result in the steering wheel 140 being turned through an angle $\beta$.

It will be appreciated that, when one is exerting a force to overcome a resistance and the resistance is released, momentum and/or inertia may result in application of the force continuing for a moment until the person applying the force realizes that the resistance was released and react by reducing or stopping application the force. The greater the force being applied, the longer or more strongly the force may continue until the person applying the force realizes the resistance has been released and is able to react by reducing or stopping application the force. By comparing FIGS. 2B and 3B, as a result of engaging the release input in the form of the turn signal 150, the force 302 required to disengage the autosteering system 120 from the steering mechanism 130 is less than the force 202 required to disengage the autosteering system 120 from the steering mechanism 130. Thus, for example, when an operator applies the default force 202 required to overcome the default threshold 205 and the autosteering system 120 is disengaged, the steering wheel 140 may abruptly turn or "jerk" through an angle $\alpha$ (FIG. 2B). By comparison, when an operator applies the adjusted force 302 required to overcome the adjusted threshold 305 and the autosteering system 120 is disengaged, the steering wheel 140 may move through a lesser angle $\beta$, resulting in less abrupt maneuver. As a result, of a lesser force 302 being required to overcome the adjusted threshold 305, the autosteering disengagement system 110 may enable an operator may be able to initiate a manual steering maneuver without abruptly turning or jerking the wheel.

Figure 4:
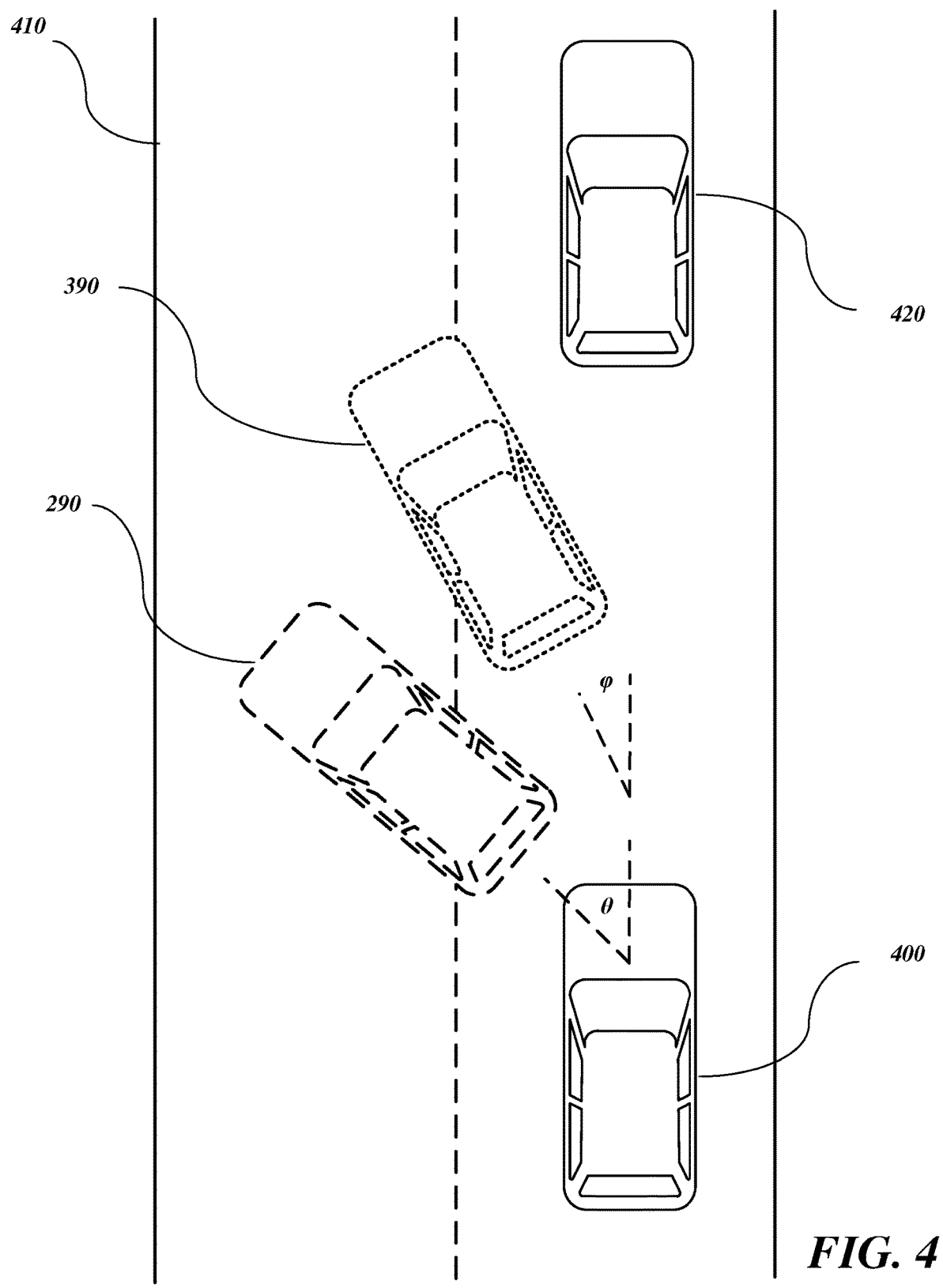

By way of illustration, referring additionally to FIG. 4, a vehicle 400 including the autosteering disengagement system 110 is traveling on a road 410 and the operator chooses to disengage the autosteering system 120 to pass another vehicle 420. As previously described, in the example of FIG. 2B, the force 202 required to disengage the autosteering system 120 resulted in the steering wheel 140 being turned through an angle $\alpha$. The resulting movement of the vehicle 400 to a new position 290 (represented in dashed lines) includes veering at an angle $\theta$. As also previously described, in the example of FIG. 3B, the lesser force 302 (as compared to the force 202) required to disengage the autosteering system 120 resulted in the steering wheel being turned through an angle $\beta$. As the product of a lesser application of force 302 to the steering wheel 140, the angle $\beta$ is less than the angle $\alpha$ that was the product of the force 202, the resulting movement of the vehicle 400 moving to a new position 390 (represented in dotted lines) is at a lesser angle $\varphi$. Thus, through the use of the turn signal 150 or other release input, the autosteering disengagement system 110 enables an operator to take deliberate action to intentionally disengage the autosteering system 120 and assert manual steering control with less extreme steering changes.

In various embodiments, further safeguards may be imposed to ensure than an operator intends to disengage the autosteering system 120 while still imposing a lesser threshold of force applied to the steering wheel 140. In various embodiments, in addition to engaging the release input, the autosteering disengagement system 110 may impose a secondary condition (i.e., a secondary predetermined condition) before reducing the threshold level of force from the default threshold 205 to the adjusted threshold 305. As described below, the secondary condition may impose a requirement that the release input be engaged before the force is applied to the steering wheel and/or that the release input be engaged to indicate a direction of the manual steering operation consistent with the direction of the force applied to the wheel, as further described with reference to FIGS. 5A-7B.

Referring additionally to FIG. 5A, an operator moves the turn signal 150 from a starting position 255 to a right-turn position 555. An adjusted threshold 505 is applied as a result of the operator engaging the release input in the form of the turn signal 150. However, because the turn signal 150 was moved into the right-turn position 555, the adjusted threshold 505 is applied only to a right-hand maneuver and the default threshold 205 remains applied for the left-hand maneuver.

Referring additionally to FIG. 5B, the force 302, which was sufficient to surpass the adjusted threshold 305 (FIGS. 3A and 3B) and disengage the autosteering system 120, does not result in disengagement of the autosteering system 120. Because the turn signal 150 was moved to a right-turn position 555, the adjusted threshold 305 was not applied for a left-hand maneuver. The force 302 also is not sufficient to surpass the default threshold 205 to disengage the autosteering system. Thus, in various embodiments, the autosteering disengagement system 110 may be configured to prevent incidental contacts with both the turn signal 150 as release input and the steering wheel 140 if the engagement of the release input and steering wheel 140 are not consistent with each other (i.e., a predetermined condition of consistency between the engagement of the release input and the steering wheel) in order to manifest an operator's intention to disengage the autosteering system 120.

Figure 6A:
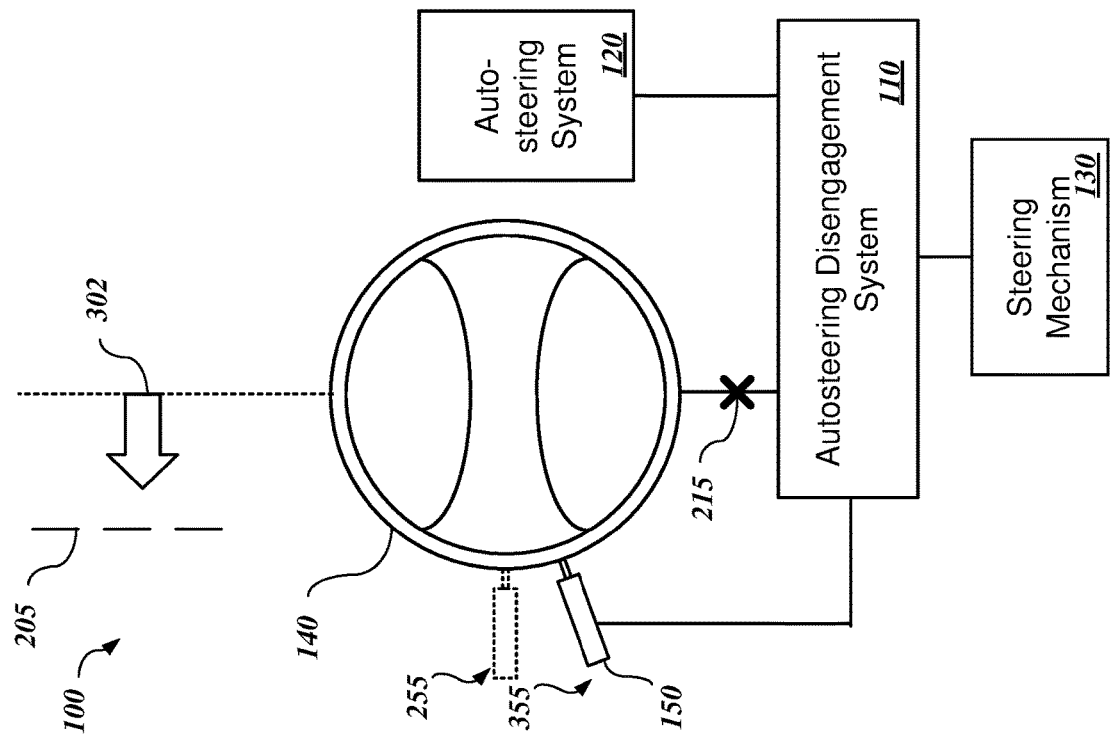

Similarly, referring additionally to FIG. 6A, an operator applies the force 302 that would have been sufficient to reach the adjusted threshold 305 (FIGS. 3A and 3B) and, thus, disengage the autosteering system 120. However, because the turn signal 150 used as release input was not engaged before the force 302 was applied (i.e., because a predetermined condition that a release input is engaged before the force 302 was applied), the adjusted threshold 305 was not applied. Because the adjusted threshold 305 was not applied and the force 302 is not sufficient to reach the default threshold 205, the autosteering system 120 remains engaged.

Figure 6B:
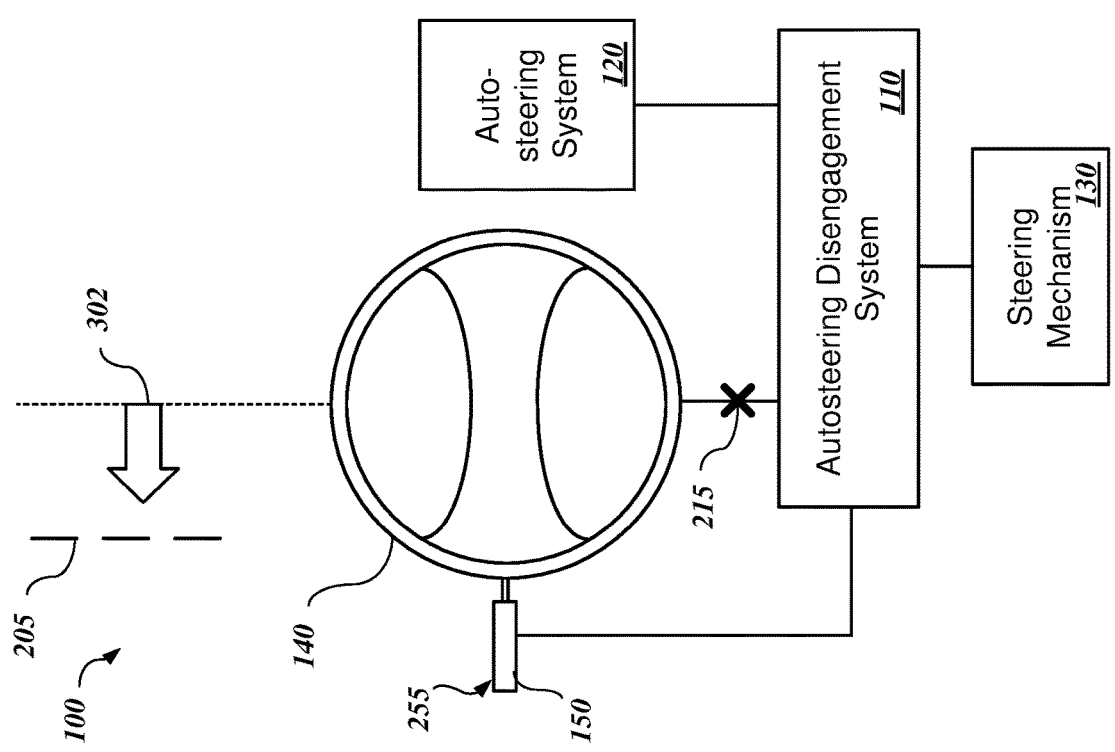

Referring additionally to FIG. 6B, with the force 302 already applied, the operator then moves the turn signal 150 to the left-turn position 355. In various embodiments, the turn signal 150 being moved into the left-turn position 355 while the force 302 in excess of the adjusted threshold has already been applied is not sufficient to apply the adjusted threshold 305. In various embodiments, the autosteering disengagement system 110 may be configured to require a predetermined condition be met that the turn signal 150 or other release input be engaged before a force sufficient to overcome the adjusted threshold is applied. Thus, by requiring that the release input be engaged before the requisite force is applied to the steering wheel, the autosteering disengagement system 110 may be further configured to prevent incidental contacts with a release input and the steering wheel 140 from unintentionally disengaging the autosteering system 120.

Figure 7A:
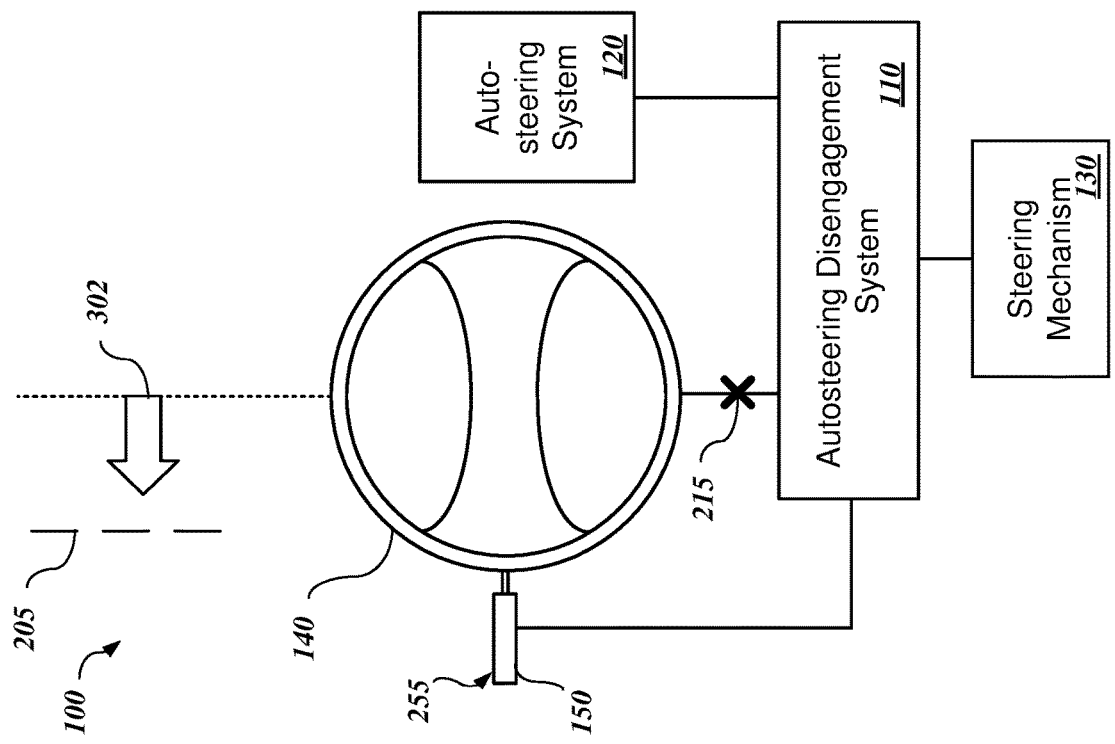
Figure 7B:
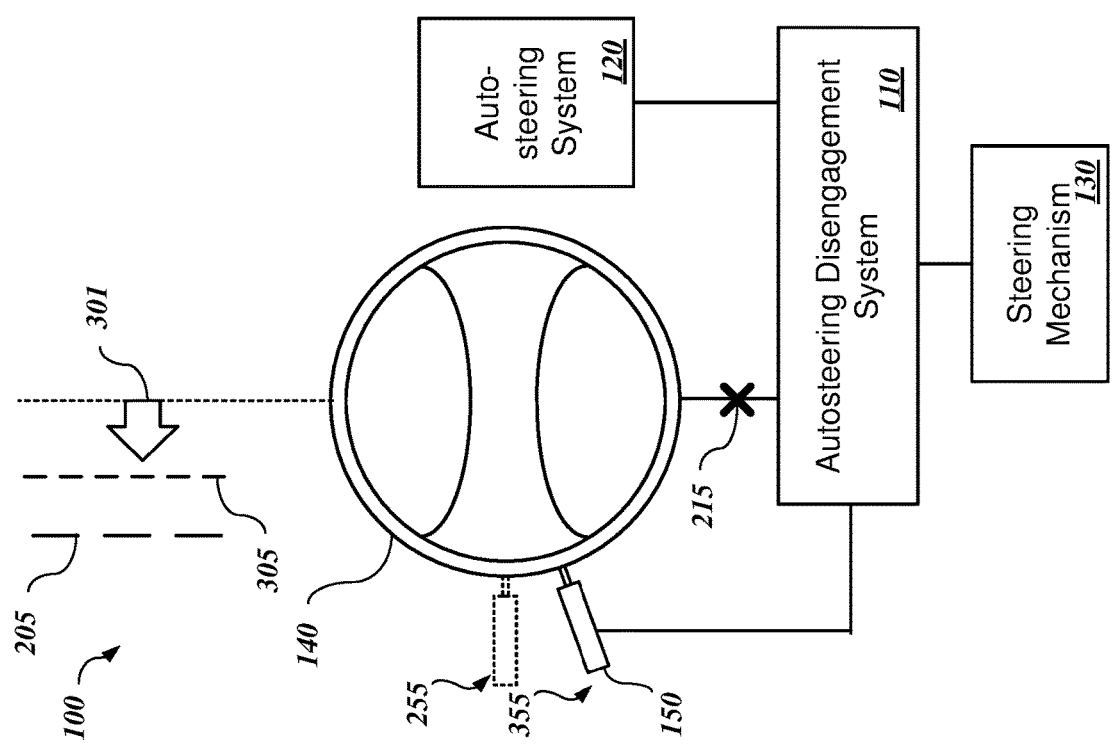

Similarly, referring additionally to FIG. 7A, an operator moves the turn signal 150 to the left-turn position to apply the adjusted threshold 305 but applies a force 301 that is not sufficient to reach the adjusted threshold 305 to disengage the autosteering system 120. Referring additionally to FIG. 7B, the operator increases the force applied to the force 302 that would be sufficient to reach the adjusted threshold 305 (FIG. 7A). However, before applying the force 302 sufficient to surpass the adjusted threshold 305, the operator has moved the turn signal 150 back to the starting position 255, thereby withdrawing the adjusted threshold 305. Thus, the force 302 is not sufficient to disengage the autosteering system 120. Thus, in various embodiments, the autosteering disengagement system 110 may be configured to require a predetermined condition be met that the turn signal 150 or other release input be engaged and its engagement maintained before a force sufficient to overcome the adjusted threshold 305 is applied. Thus, by requiring that the release input be engaged and maintained before the requisite force is applied to the steering wheel, the autosteering disengagement system 110 may be further configured to prevent incidental contacts with both the release input and the steering wheel 140 from unintentionally disengaging the autosteering system 120.

As previously described, in addition to the autosteering disengagement system 110 reducing the threshold level of force in response to an operator engaging a release input, in various embodiments, the autosteering disengagement system 110 may dictate application of a higher threshold level of force to disengage the autosteering system 120. When an external condition is detected by the external sensors 113, such as a presence of a hazard at the side of the road or proximity of another vehicle, the default threshold may be increased to an adjusted threshold. Thus, when a dangerous external condition is detected, the autosteering disengagement system 110 may dictate application of a higher threshold level of force to be sure that the operator intends to retake manual control before disengaging the autosteering system 120.

In the examples of FIGS. 8A-11B, the autosteering disengagement system 110 is used in an automatically-steered vehicle 860 that travels a road 850 under control of the autosteering system 120. As further described below, the autosteering disengagement system 110 responds to external conditions detected by the external sensors 113 to change a threshold level of force required to disengage the autosteering system 120. When the autosteering disengagement system 110 disengages the autosteering system 120, a now manually-steered vehicle 862 responds to operator control of the steering mechanism 130.

Figure 8A:
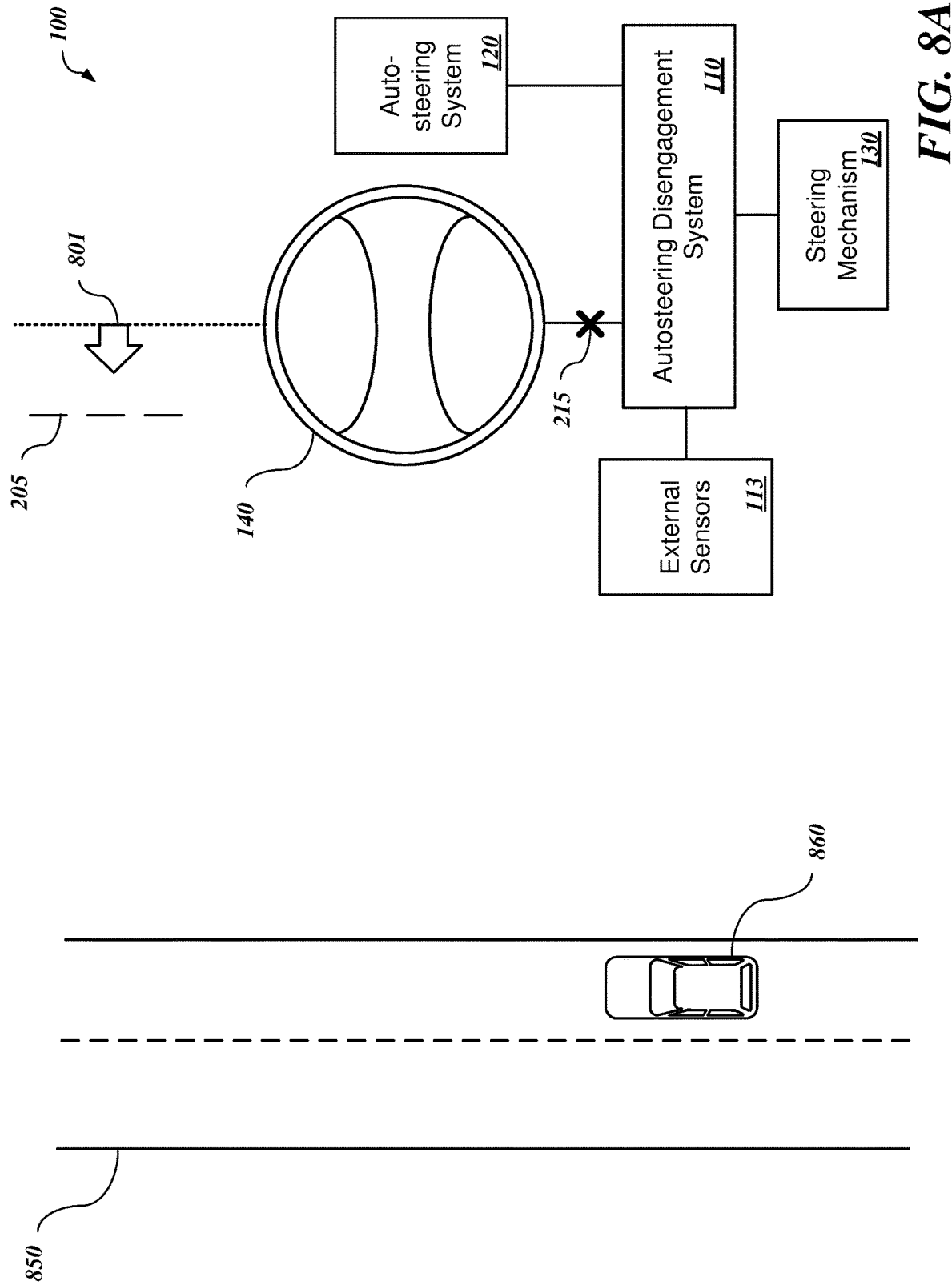

Referring additionally to FIG. 8A, the force 201 is applied to the steering wheel 140. The force 801 applied is short of the default threshold 205 to disengage the autosteering system 120, as in the examples of FIGS. 2A and 3A. As a result, the autosteering system 120 remains engaged because the force 201 applied to the steering wheel 140 is not sufficient to engage the manual steering system, as represented by the X 215 indicating that the steering wheel 140 is not engaged with the steering mechanism 130.

Figure 8B:
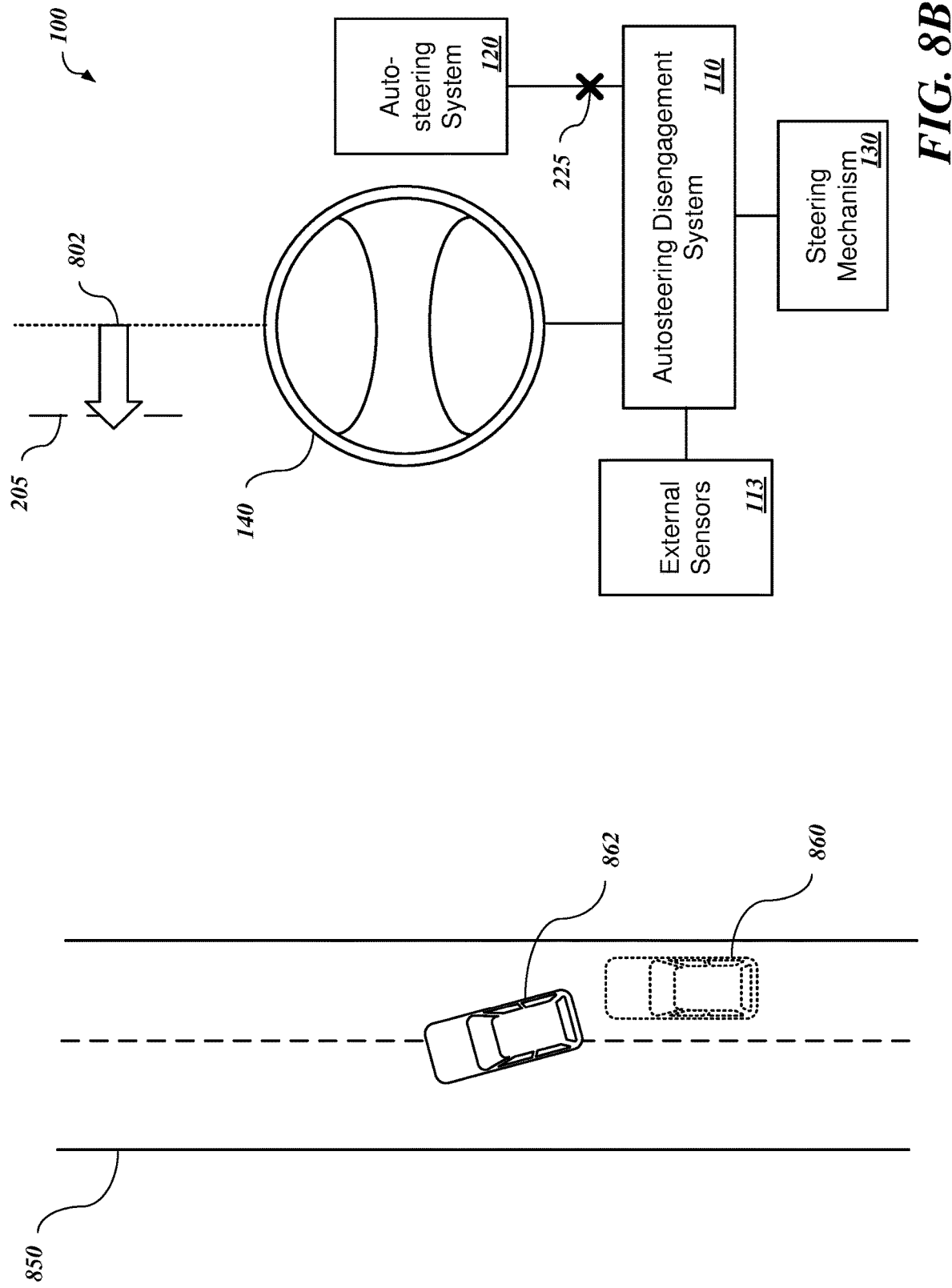

Referring additionally to FIG. 8B, a force 802, larger than the force 201 (FIGS. 2A, 3A, and 8A) is applied to the steering wheel 140. By contrast with FIG. 8A, the force 802 surpasses the default threshold 205. Thus, the autosteering system 120 is disengaged, as represented by the X 225 indicating that the autosteering system 120 is disengaged from the steering mechanism 130. Thus, in various embodiments, as described with reference to FIGS. 2A and 2B, the autosteering disengagement system 110 enables disengagement of the autosteering system 120 as a result of the application of the force 802 in excess of the default threshold 205. The now manually-steered vehicle 862 responds to operator control of the steering mechanism 130. As described below, in the example of FIGS. 8A and 8B, there are no external conditions on or adjacent to the road 850 that cause the autosteering disengagement system 110 to apply an adjusted threshold, as further described below.

Referring additionally to FIG. 9A, the vehicle 860 follows a second vehicle 970, and an operator applies a force 901 in excess of the default threshold 205 in an effort to take manual steering control of the vehicle 860 to pass the second vehicle 970. However, the external sensors 113, as previously described, detect an obstacle 990 in an adjoining lane 950 that would be in the path of the vehicle 860 if the operator takes manual steering control of the vehicle 860. In response to detecting the external condition (i.e., in response to detecting that a predetermined condition of detecting an external condition is met) presented by the obstacle 990, the autosteering disengagement system 110 applies an adjusted threshold 905 that dictates application of a higher level of force to disengage the autosteering system 120. The force 901 does not meet the adjusted threshold 905, thus, the autosteering system 120 remains engaged and the steering wheel 140 is not engaged with the steering mechanism 130 as represented by the X 215.

Figure 9B:
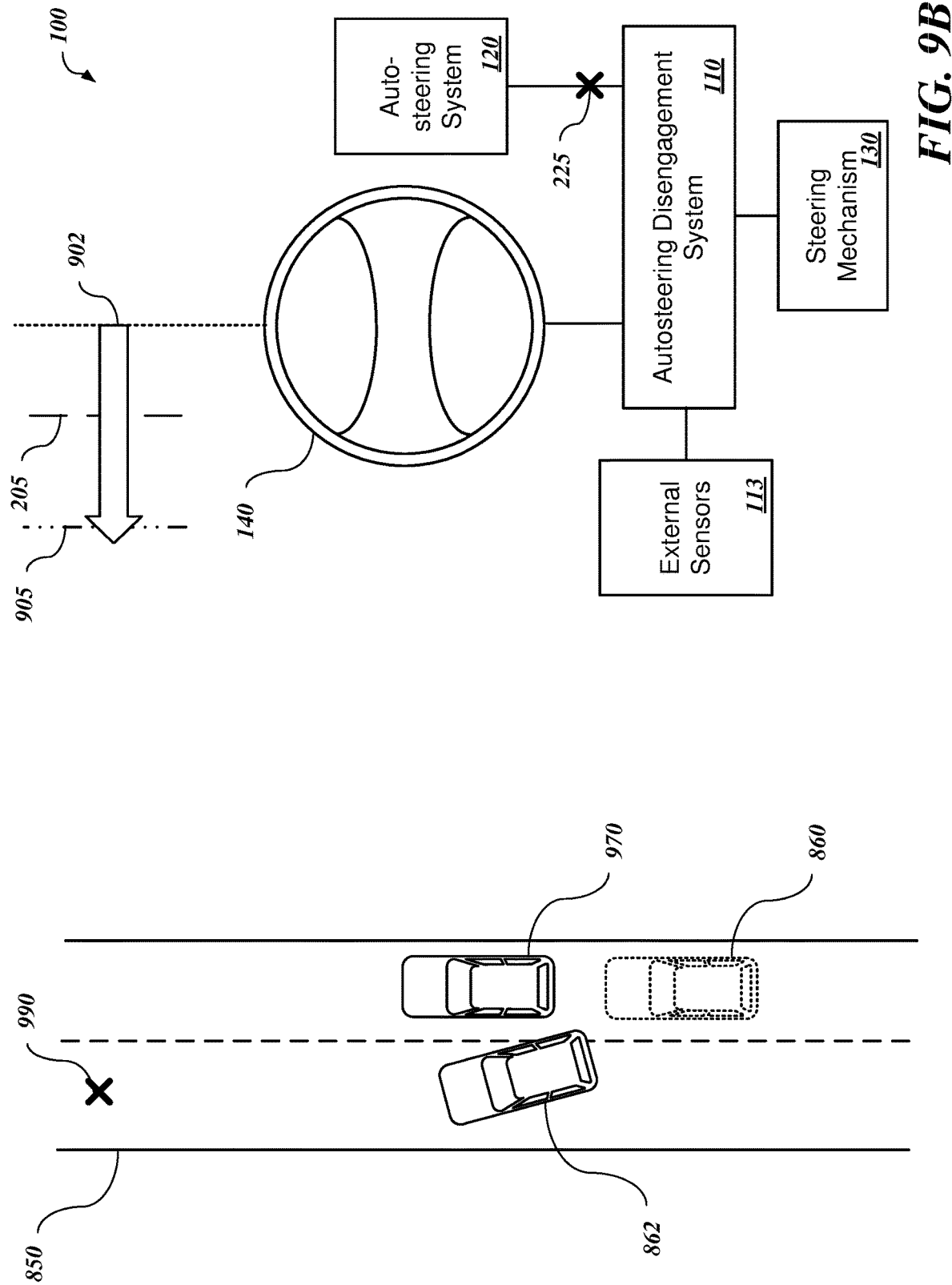

Referring additionally to FIG. 9B, an operator applies a higher force 902 to the steering wheel 140 that surpasses the adjusted threshold 905. As a result, the autosteering system 120 is disengaged, as represented by the X 225 indicating that the autosteering system 120 is disengaged from the steering mechanism 130. Thus, the manually-steered vehicle 862 moves into the adjoining lane 950. The autosteering disengagement system 110, by applying the increased, adjusted threshold 905 upon detecting the external condition 990, provides a measure of added driver intentionality by requiring the operator to apply a greater level of force to the steering wheel 140 to disengage the autosteering system 120.

Figure 10A:
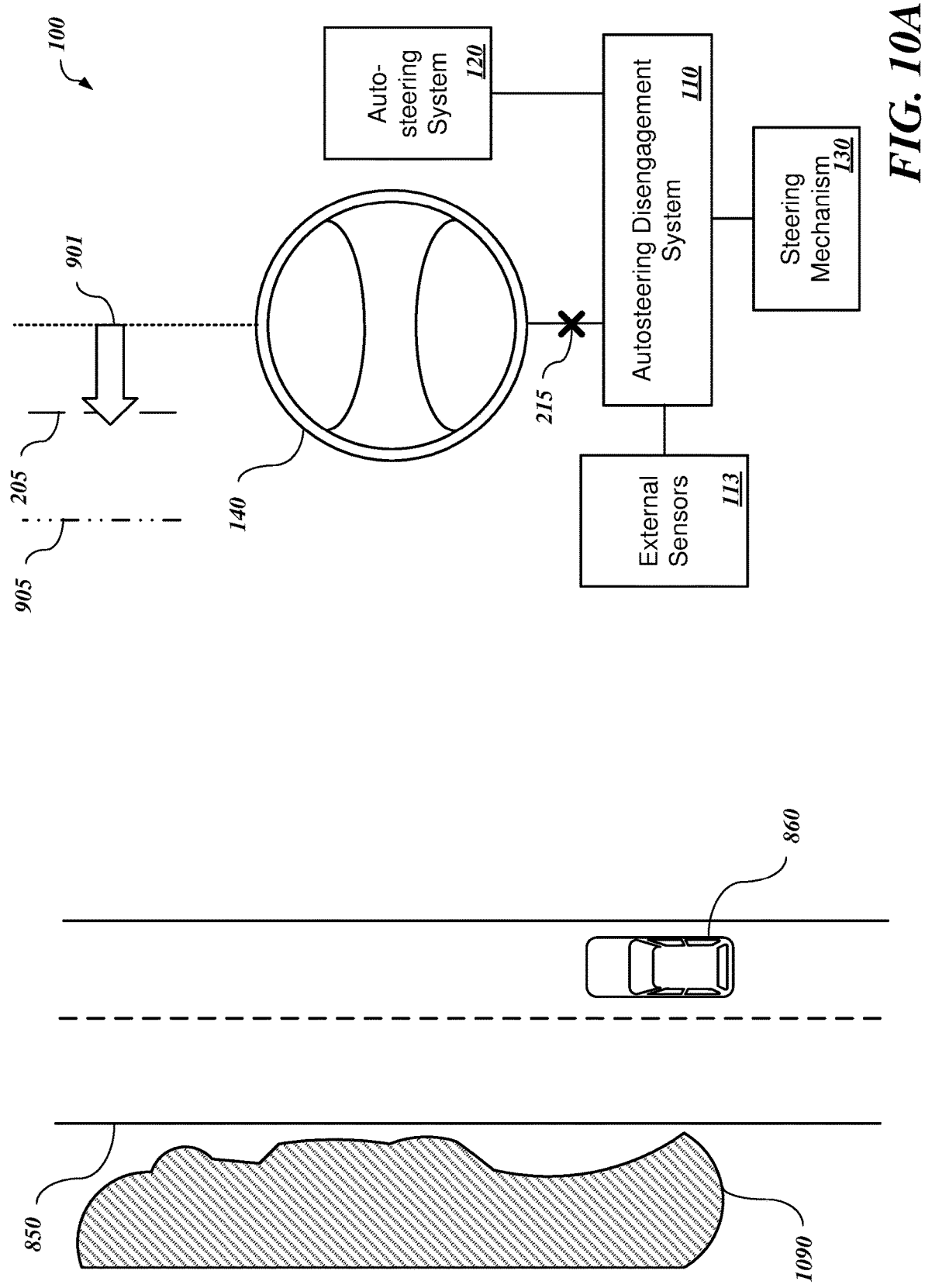

Referring additionally to FIG. 10A, an unsafe condition 1090 adjacent to the road 850 is detected by the external sensors 113. The unsafe condition 1090 may be a collapsed shoulder, a ditch, a cliff, water, debris, one or more stopped vehicles, or another condition that abuts or encroaches upon the road 850. As previously described, the external sensors 113 may include a GPS or other devices that receive information about the unsafe condition 1090 or that directly detect the unsafe condition 1090. The operator applies the force 901 that surpasses the default threshold 205 in an attempt to disengage the autosteering system 120. However, in response to the external sensors 113 detecting the unsafe condition 1090 (i.e., in response to detecting that a predetermined condition of detecting an unsafe condition is met), the autosteering disengagement system 110 applies the higher, adjusted threshold 905 that dictates application of a higher level of force to disengage the autosteering system 120. The force 901 does not meet the adjusted threshold 905, thus, the autosteering system 120 remains engaged and the steering wheel 140 is not engaged with the steering mechanism 130 as represented by the X 215.

Referring additionally to FIG. 10B, an operator applies the higher force 902 to the steering wheel 140 that surpasses the adjusted threshold 905. As a result, the autosteering system 120 is disengaged, as represented by the X 225 indicating that the autosteering system 120 is disengaged from the steering mechanism 130. Thus, the now manually-steered vehicle 862 responds to operator control of the steering mechanism 130. The autosteering disengagement system 110, by applying the increased, adjusted threshold 905 upon detecting the unsafe condition 1090, provides a measure of added driver intentionality by requiring the operator to apply a greater level of force to the steering wheel 140 to disengage the autosteering system 120.

Figure 11A:
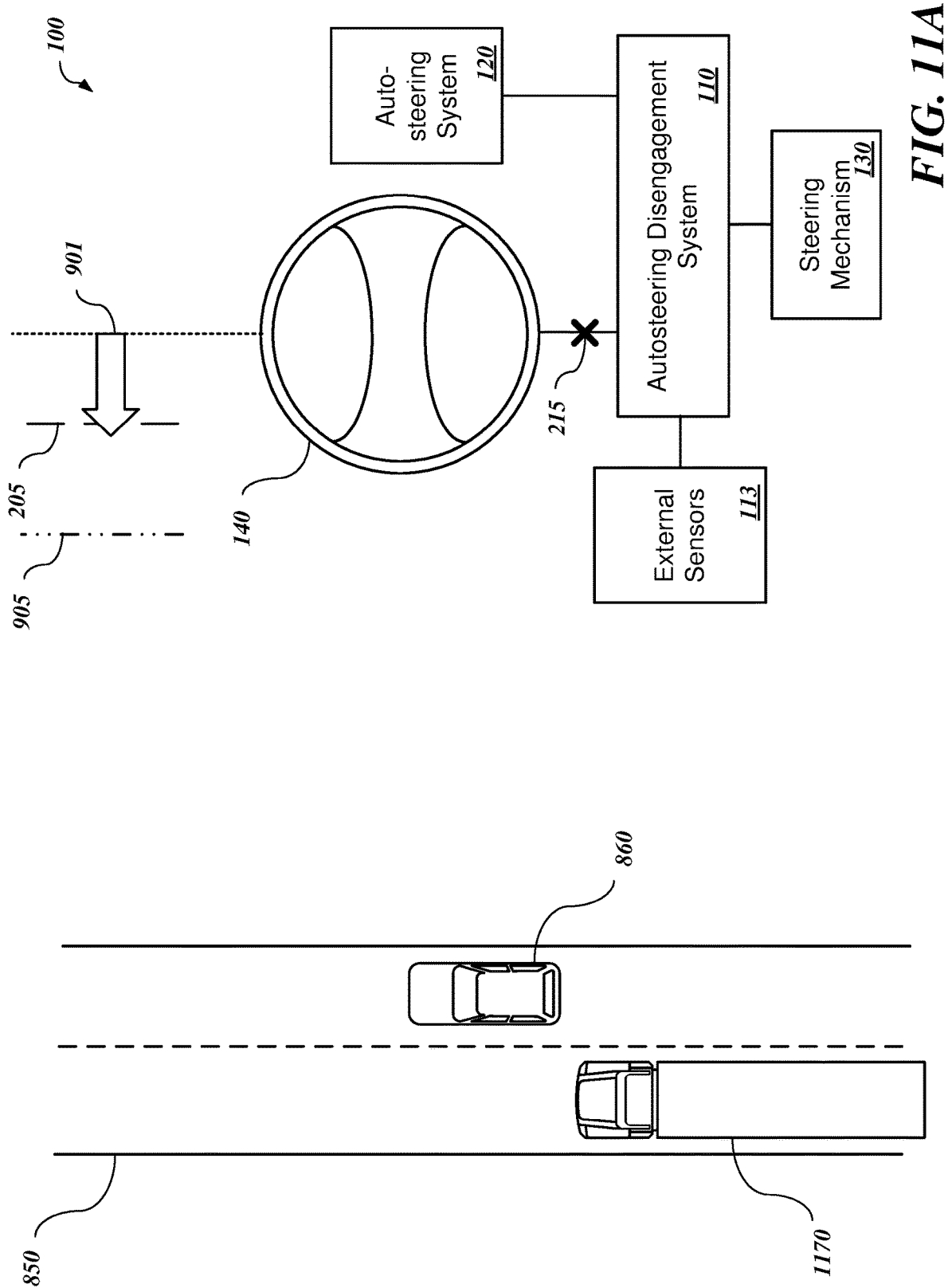

Referring additionally to FIG. 11A, an external condition in the form of a second vehicle 1170 approaching the vehicle 860 is detected by the external sensors 113. The external sensors 113 may include a blind spot detection system or other proximity detection system. The operator applies the force 901 that surpasses the default threshold 205 in an attempt to disengage the autosteering system 120. However, in response to the external sensors 113 detecting the second vehicle 1170 (i.e., in response to detecting that a predetermined condition of an approaching vehicle is met), the autosteering disengagement system 110 applies the higher, adjusted threshold 905 that dictates application of a higher level of force to disengage the autosteering system 120. The force 901 does not meet the adjusted threshold 905, thus, the autosteering system 120 remains engaged and the steering wheel 140 is not engaged with the steering mechanism 130 as represented by the X 215.

Referring additionally to FIG. 11B, an operator applies the higher force 902 to the steering wheel 140 that surpasses the adjusted threshold 905. As a result, the autosteering system 120 is disengaged, as represented by the X 225 indicating that the autosteering system 120 is disengaged from the steering mechanism 130. Thus, the now manually-steered vehicle 862 responds to operator control of the steering mechanism 130. The autosteering disengagement system 110, by applying the increased, adjusted threshold 905 upon detecting the second vehicle 1170, provides a measure of added driver intentionality by requiring the operator to apply a greater level of force to the steering wheel 140 to disengage the autosteering system 120.

Figure 12:
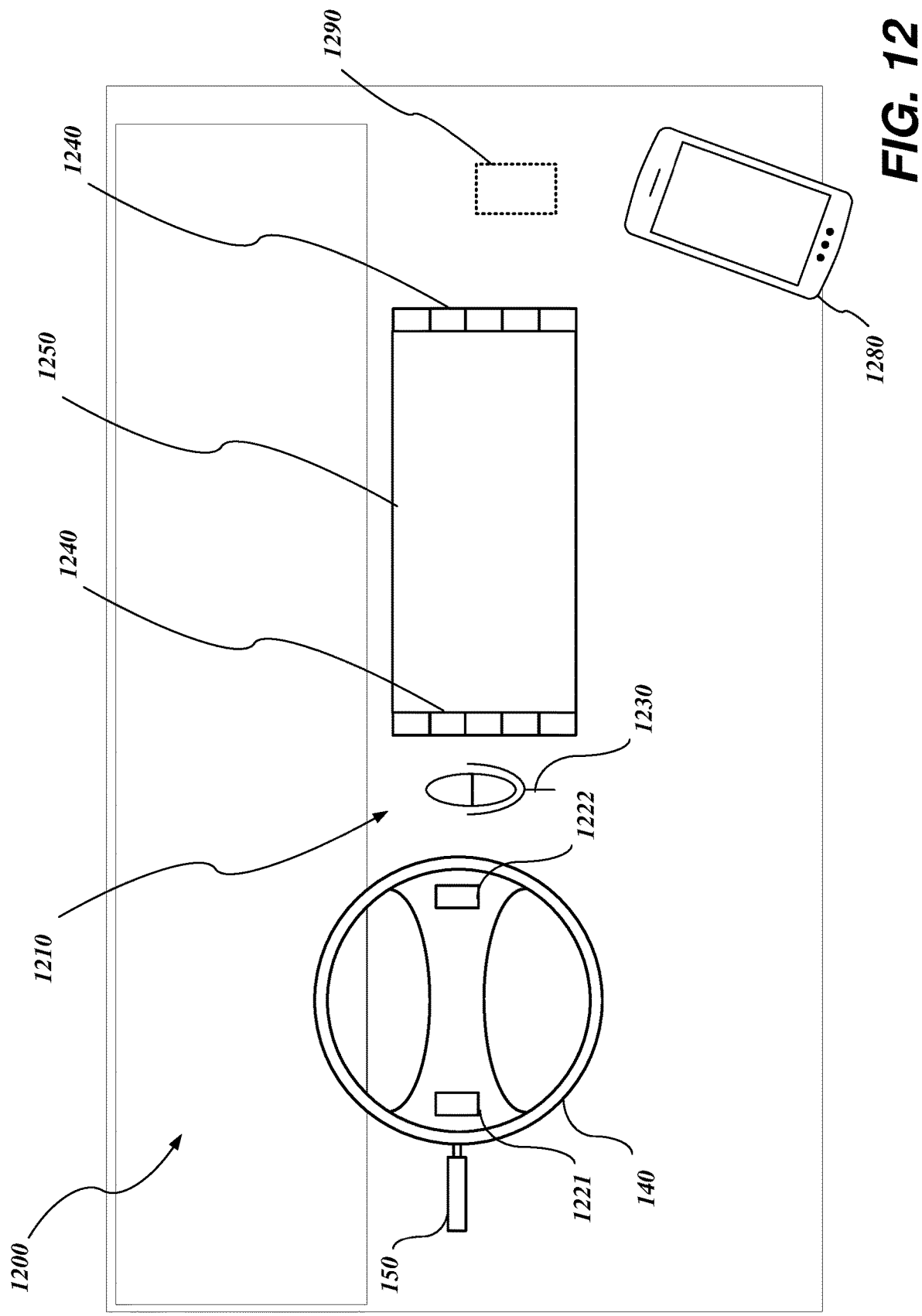
FIG. 12 is a perspective view of a cabin of a vehicle equipped with the autosteering disengagement system of FIG. 1.

Referring additionally to FIG. 12, in various embodiments the steering wheel 140 or a dashboard or console 1210 in a cabin of a vehicle may include different and/or additional release inputs. As previously described, the turn signal 150 may be employed as the release input. In addition, in various embodiments the steering wheel 140 may include one or more release buttons 1221 and 1222 as release inputs that may be depressed to apply the lower threshold to release the autosteering system 120. As shown in FIGS. 5A and 5B, the release buttons 1221 and 1222 may be disposed on opposing sides of the steering wheel 140. In such embodiments, with the release buttons 1221 and 1222 being disposed on opposing sides of the steering wheel 140, the autosteering disengagement system 110 may require that a predetermined condition be met that the release button 1221 and 1222 on a side toward which the force is applied be engaged in order to apply the adjusted threshold. It will be appreciated that, in such embodiments, the release buttons 1221 and 1222 (placed on the steering wheel 140) may be engaged by an operator without the operator removing his or her hands from the wheel. In addition, in various embodiments an audio input interface 1230, such as a microphone, may be used to receive a verbal command from the operator as a release input. In various embodiments, other inputs, including other buttons or keys 1240 on the dashboard or console 1210, may also be used as release inputs.

Figure 13:
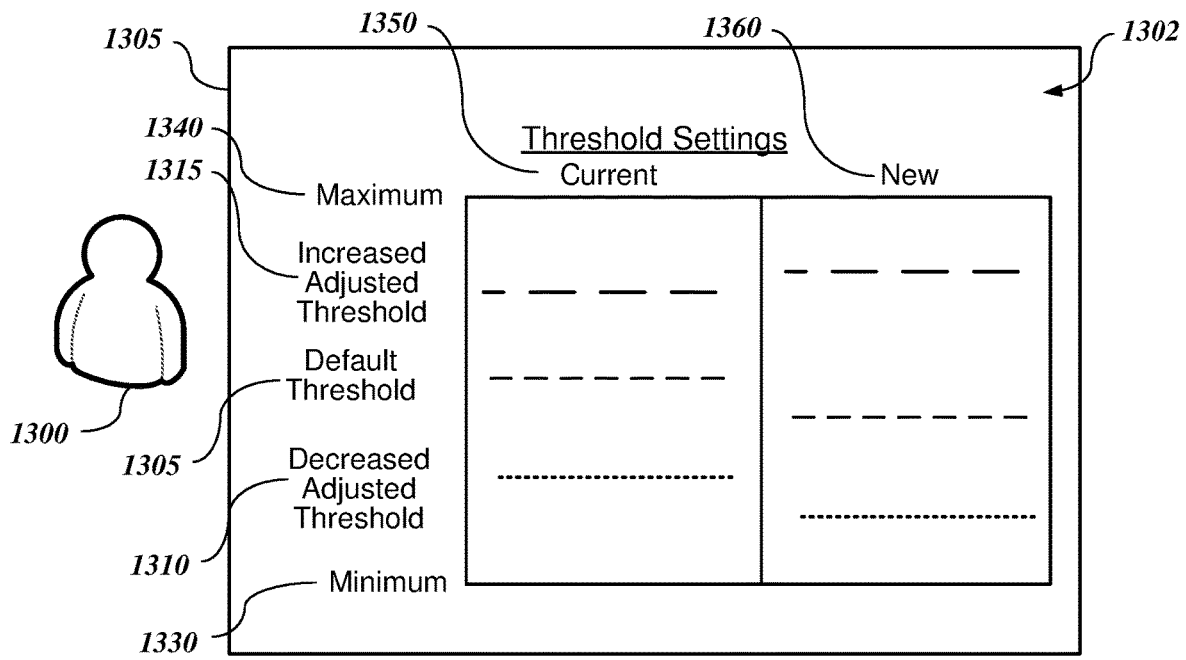
FIG. 13 is a screen diagram enabling an operator to set threshold levels used by the autosteering disengagement system of FIG. 1.

Referring additionally to FIG. 13, in various embodiments an operator 1300 may change the threshold settings 1302. The operator 1300 may use an interface 1305, such as vehicle interface 850 (FIG. 8) in communication with the autosteering disengagement system 110. The thresholds also may be set using another computing device 1280 (FIG. 12), such as a smartphone or a computer, that is able to interface with the autosteering disengagement system 110 via a wired or wireless interface 1290 directly or via a network. The operator 1300 may set a level of a reduced adjusted threshold 1310, such as may be applied when a release input is used to corroborate the intent of the operator 1300 to take manual steering control of the vehicle as described with reference to FIGS. 2A-7B. Additionally or alternatively, the operator 1300 may set a level of an increased adjusted threshold 1315, such as may be applied when the external sensors 113 detect an external condition as described with reference to FIGS. 8A-11B. The threshold levels 1310 and 1315 may be set between a minimum level 1330 and a maximum level 1340 to adjust the thresholds 1310 and 1315 from current levels 1350 to new levels 1360 and thereby set a difference between the thresholds 1310 and 1315 and a default threshold 1305.

Figure 14:
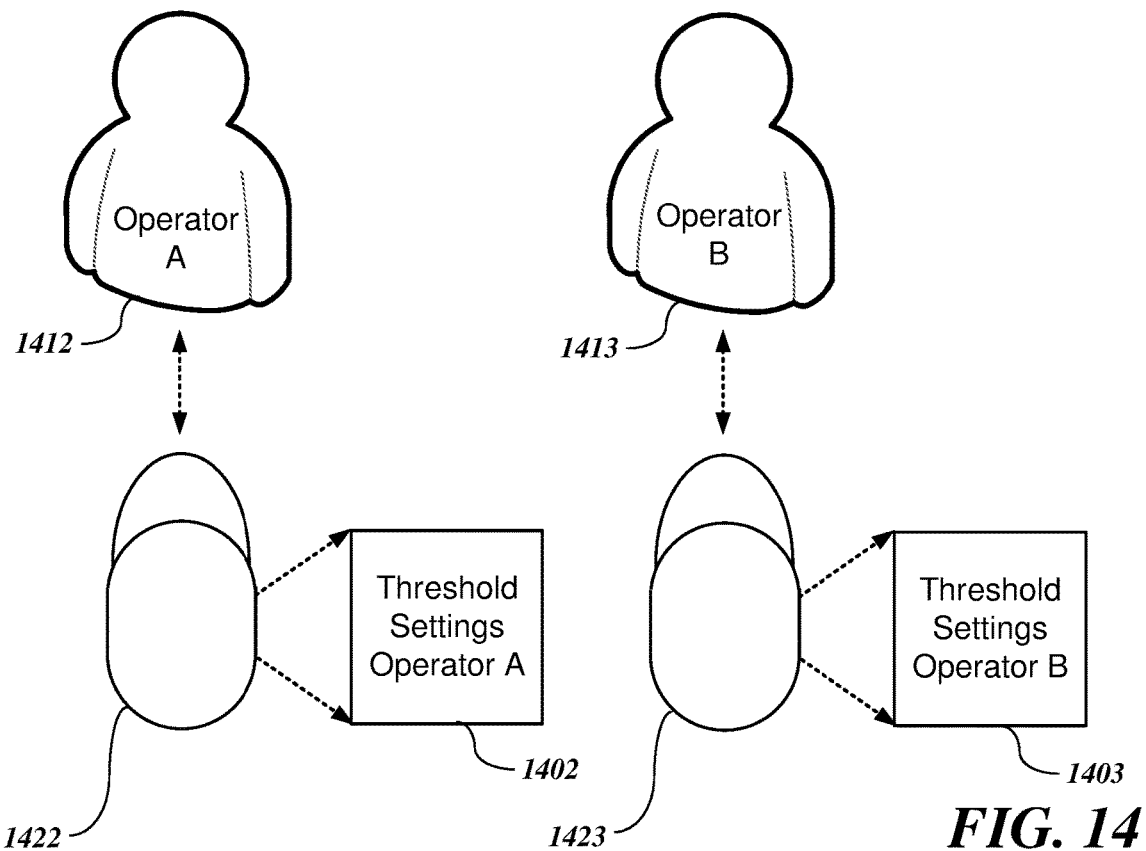
FIG. 14 is a schematic diagram of different sets of threshold settings being associated with different operators.

Referring additionally to FIG. 14, in various embodiments different operators may prefer different threshold settings 1402 and 1403, which operator A 1412 and operator B 1413 each may set as described with reference to FIG. 9. For convenience, the threshold settings 1402 and 1403 may be associated with operating credentials 1422 and 1423 (represented by key fobs associated with operator A 1412 and operator B 1413, respectively). In various embodiments, the operating credentials may be verified at the vehicle or via a remote system (e.g., via a network-based or cloud-based system) with image recognition, voice recognition, or another form of authentication. As a result, when each of the operators 1412 and 1413 present their operating credentials to operate the vehicle, the appropriate threshold settings 1402 and 1403 may be applied.

Figure 15:
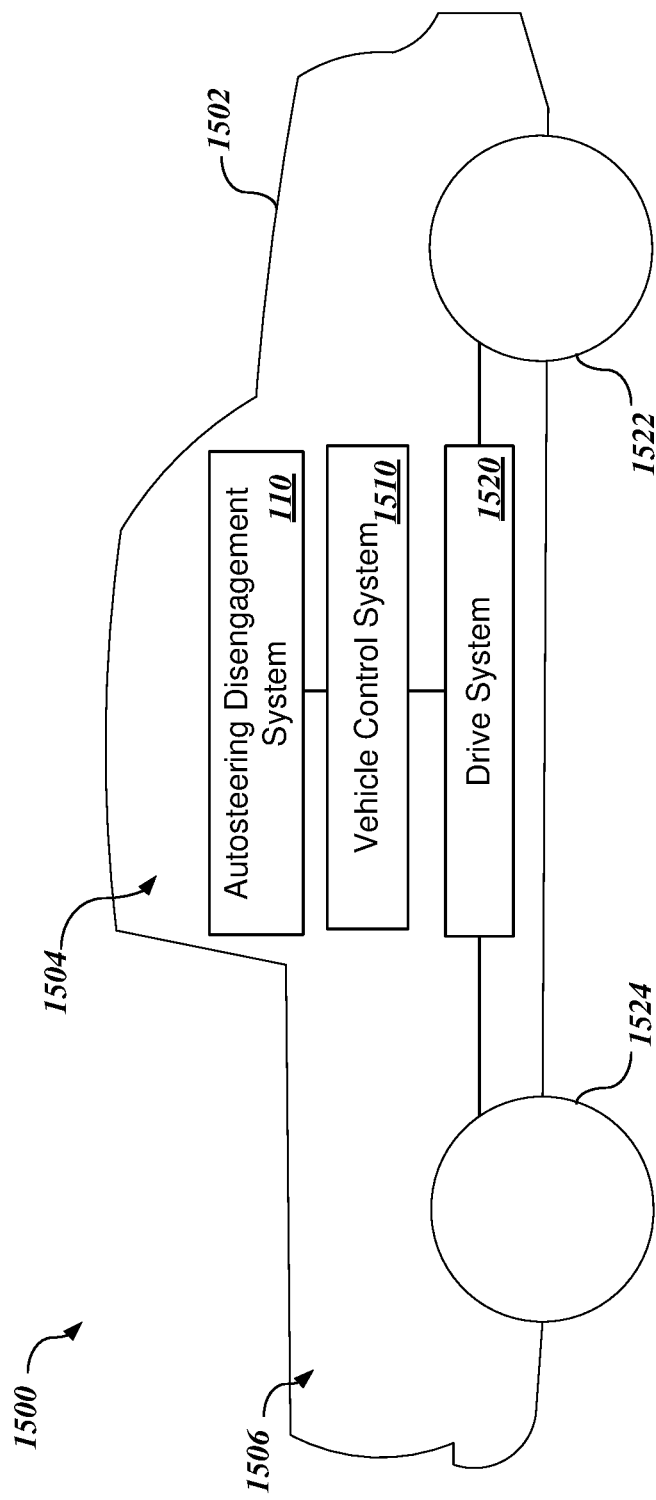

Referring additionally to FIG. 15, in various embodiments a vehicle 1500 includes an integrated vehicle control system 1510 that controls operation of the vehicle 1500. In various embodiments, the vehicle control system 1510 may incorporate or interoperate with the autosteering disengagement system 110. In various embodiments, the vehicle control system 1510 may incorporate or interoperate with the autosteering system 120 (not separately shown in FIG. 15). In various embodiments, the vehicle 1500 includes a body 1502 that may include a cabin 1504 capable of accommodating an operator, one or more passengers, and/or cargo and a cargo area 1506 separate from the cabin 1504, such as a trunk or a truck bed, capable of transporting cargo. The vehicle 1500 includes a drive system 1520, as further described below, which is selectively engageable with one or more front wheels 1522 and/or one or more rear wheels 1524 to motivate, accelerate, decelerate, stop, and steer the vehicle 1500.

Referring additionally to FIG. 16, in various embodiments the autosteering disengagement system 110 may be used with an electrically-powered vehicle 1600. In such embodiments the wheels 1612 and/or 1614 may be motivated by one or more electrically-powered drive systems 1620 and/or 1630, such as motors, operably coupled with the wheels 1612 and/or 1614. The drive systems 1620 and 1630 draw power from a battery system 1610, which also may be used to power the autosteering disengagement system 110 and other vehicle systems.

Referring additionally to FIG. 17, in various embodiments the autosteering disengagement system 110 may be used with an internal combustion engine-powered vehicle 1700. The wheels 1712 and/or 1714 may be motivated by an internal combustion or hybrid engine 1720 coupled with a fuel tank 1710 via a fuel line 1712. The engine 1720 may be coupled to the wheels 1712 and/or 1714 by mechanical linkages 1730 and 1740, respectively, including axles, transaxles, or other drive train systems to provide rotational force to power the wheels 1712 and/or 1714. It will be appreciated that FIGS. 15-17 show four-wheeled land vehicles. However, as previously mentioned, it will be appreciated that the autosteering disengagement system 110 may be integrated with other vehicles that include autosteering systems.

Figure 18:
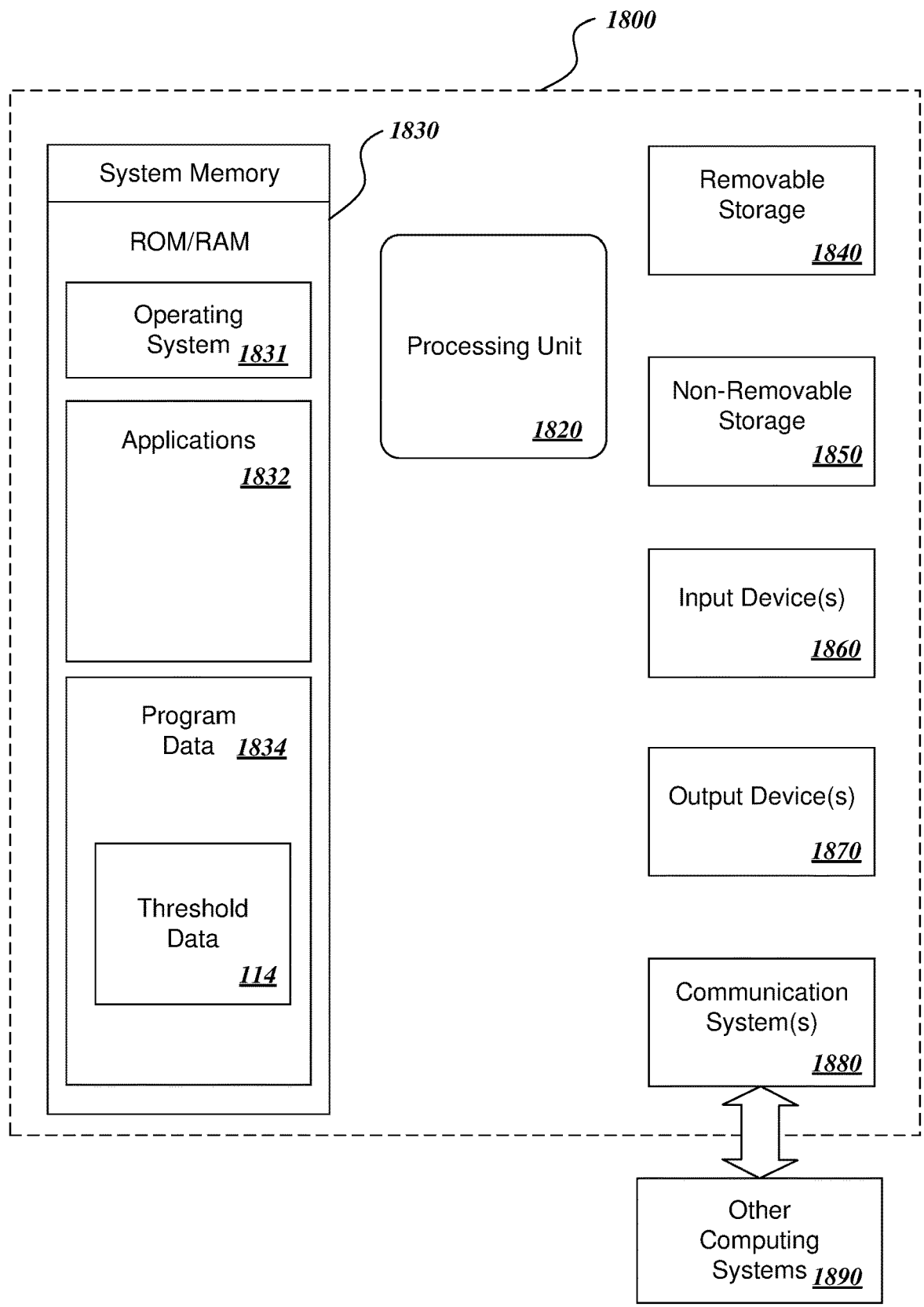
FIG. 18 is a block diagram of an illustrative computing device for performing functions of the autosteering disengagement system of FIG. 1.

Referring additionally to FIG. 18 and given by way of example only and not of limitation, the autosteering disengagement system 110 may include a general purpose computing device 1800 configured to operate according to computer-executable instructions for controlling disengagement of an autosteering system as herein described. The computing device 1800 typically includes at least one processing unit 1820 and a system memory 1830. Depending on the configuration and type of computing device, the system memory 1830 may include volatile memory, such as random-access memory ("RAM"), non-volatile memory, such as read-only memory ("ROM"), flash memory, and the like, or a combination of volatile memory and non-volatile memory. The system memory 1830 typically maintains an operating system 1831, one or more applications 1832, and program data 1834. The operating system 1831 may include any number of operating systems executable on desktop or portable devices including, but not limited to, Linux, Microsoft Windows®, Apple iOS®, or Android®, or a proprietary operating system. The applications 1832 may include instructions implementing functions of the autosteering disengagement system 110 as previously described. The program data 1834 may include the threshold data 114 (FIG. 1) used by the autosteering disengagement system 110 as previously described.

The computing device 1800 may also have additional features or functionality. For example, the computing device 1800 may also include additional data storage devices (removable and/or non-removable) such as, for example, magnetic disks, optical disks, tape, or flash memory. Such additional storage devices are illustrated in FIG. 18 by removable storage 1840 and non-removable storage 1850. Computer storage media may include volatile and non-volatile, removable and non-removable media implemented in any method or technology for storage of information, such as computer-readable instructions, data structures, program modules or other data. The system memory 1830, the removable storage 1840, and the non-removable storage 1850 are all examples of computer storage media. Available types of computer storage media include, but are not limited to, RAM, ROM, EEPROM, flash memory (in both removable and non-removable forms) or other memory technology, CD-ROM, digital versatile disks (DVD) or other optical storage, magnetic cassettes, magnetic disk storage or other magnetic storage devices, or any other medium which can be used to store the desired information and which can be accessed by the computing device 1800. Any such computer storage media may be part of the computing device 1800.

The computing device 1800 may also have input device(s) 1860 such as a keyboard, stylus, voice input device, touch-screen input device, etc. Output device(s) 1870 such as a display, speakers, short-range transceivers such as a Bluetooth transceiver, etc., may also be included. The computing device 1800 also may include one or more communication systems 1880 that allow the computing device 1800 to communicate with other computing systems 1890, such as those described previously with reference to FIG. 13. As previously mentioned, the communication system 1880 may include systems for wired or wireless communications. Available forms of communication media typically carry computer-readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of illustrative example only and not of limitation, communications media may include wired media such as a wired network or direct-wired connection, and wireless media such as acoustic, radio frequency (RF), infrared and other wireless media. The term computer-readable media as used herein includes both storage media and communication media.

Figure 19:
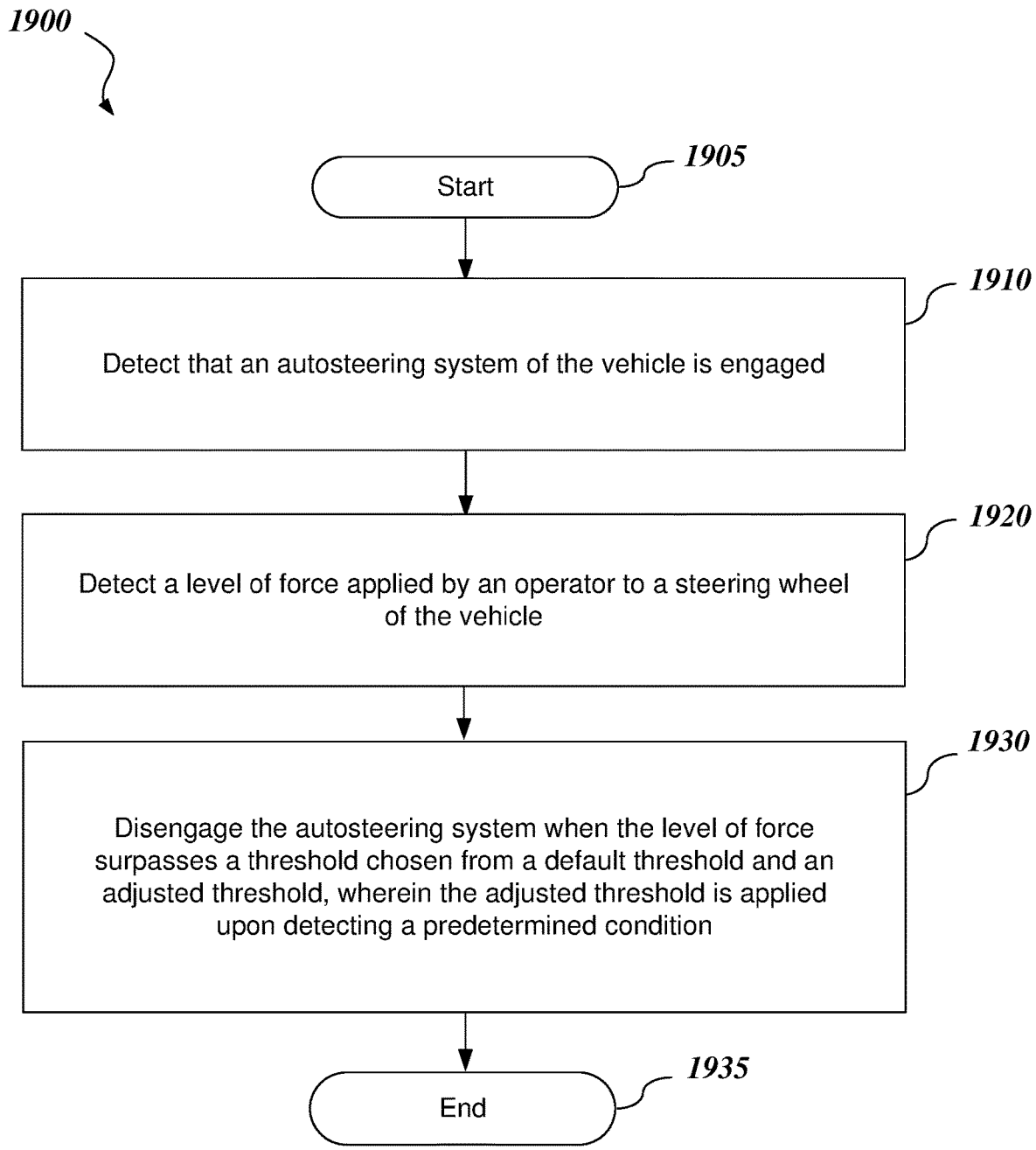
FIG. 19 is a flow chart of an illustrative method for disengaging an autosteering system.

Referring additionally to FIG. 19, an illustrative method 1900 is provided for selectively disengaging the autosteering system of a vehicle. The method 1900 starts at a block 1905. At a block 1910, it is recognizing that a vehicle is operating in an autosteering mode in which a vehicle control system guides steering of the vehicle. At a block 1920, a level of force applied by an operator to a steering wheel of the vehicle is detected. At a block 1930, the vehicle is switched from the autosteering mode to a manual steering mode under control of the operator when the level of force surpasses a threshold chosen from a default threshold and an adjusted threshold that is applied upon detecting a predetermined condition for applying the adjusted threshold, as previously described with reference to FIGS. 2A-12. The method 1900 ends at a block 1935.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. A system comprising:
    a computing device operably coupled with a vehicle including:
        a processor; and
        computer-readable media configured to store computer-executable instructions configured to cause the processor to:
            detect that an autosteering system of the vehicle is engaged;
            select between a default threshold and an adjusted threshold different from the default threshold based on whether a predetermined condition associated with the vehicle is detected;
            detect a level of force applied by an operator to a steering wheel of the vehicle; and
            disengage the autosteering system based on the level of force exceeding the adjusted threshold in response to the predetermined condition being detected or exceeding the default threshold in response to the predetermined condition not being detected, wherein the predetermined condition includes engagement of a release input indicating that the operator intends to make a manual steering change in combination with a secondary condition that the release input is engaged in a same direction as the level of force applied to the steering wheel.

2. The system of claim 1, wherein the adjusted threshold corresponds to a lower level of force than the default threshold.

3. The system of claim 2, wherein the release input includes an input chosen from a turn signal, a release button, and a verbal release command.

4. The system of claim 2, wherein the predetermined condition includes engagement of the release input in combination with a secondary condition that the release input is engaged before the level of force is applied to the steering wheel.

5. The system of claim 1, wherein the predetermined condition includes detecting a presence of an external condition on at least one side of the vehicle, and wherein the adjusted threshold corresponds to a higher level of force than the default threshold.

6. The system of claim 5, wherein the external condition includes a hazard chosen from an obstacle in at least one adjacent lane of a roadway on which the vehicle is traveling, an unsafe condition on the at least one side of the roadway, and a presence of another vehicle on the at least one side of the vehicle.

7. A vehicle comprising:
a drive system; and
a computing device operably coupled with the vehicle including:
a processor; and
computer-readable media configured to store computer-executable instructions configured to cause the processor to:
detect that an autosteering system of the vehicle is engaged;
select between a default threshold and an adjusted threshold different from the default threshold based on whether a predetermined condition associated with the vehicle is detected;
detect a level of force applied by an operator to a steering wheel of the vehicle; and
disengage the autosteering system based on the level of force exceeding the adjusted threshold in response to the predetermined condition being detected or exceeding the default threshold in response to the predetermined condition not being detected, wherein the predetermined condition includes engagement of a release input indicating that the operator intends to make a manual steering change in combination with a secondary condition that the release input is engaged in a same direction as the level of force applied to the steering wheel.

8. The vehicle of claim 7, wherein the adjusted threshold corresponds to a lower level of force than the default thresholds.

9. The vehicle of claim 8, wherein the release input includes an input chosen from a turn signal, a release button, and a verbal release command.

10. The vehicle of claim 8, wherein the predetermined condition includes engagement of the release input in combination with a secondary condition that the release input is engaged before the level of force is applied to the steering wheel.

11. The vehicle of claim 7, wherein the predetermined condition includes detecting a presence of an external condition on at least one side of the vehicle, and wherein the adjusted threshold corresponds to a higher level of force than the default threshold.

12. The vehicle of claim 11, wherein the external condition includes a hazard chosen from an obstacle in at least one adjacent lane of a roadway on which the vehicle is traveling, an unsafe condition on the at least one side of the roadway, and a presence of another vehicle on the at least one side of the vehicle.

13. A computer-implemented method comprising:
detecting that an autosteering system of a vehicle is engaged;
selecting between a default threshold and an adjusted threshold different from the default threshold based on whether a predetermined condition associated with the vehicle is detected;
detecting a level of force applied by an operator to a steering wheel of the vehicle; and
disengaging the autosteering system based on the level of force exceeding the adjusted threshold in response to the predetermined condition being detected or exceeding the default threshold in response to the predetermined condition not being detected, wherein the predetermined condition includes engagement of a release input indicating that the operator intends to make a manual steering change in combination with a secondary condition that the release input is engaged in a same direction as the level of force applied to the steering wheel.

14. The computer-implemented method of claim 13, wherein the adjusted threshold dictates application of a lower level of force than the default threshold.

15. The computer-implemented method of claim 14, wherein the predetermined condition includes engagement of the release input in combination with a secondary condition chosen from the release input being activated before the level of force is applied to the steering wheel.

16. The computer-implemented method of claim 13, wherein the predetermined condition includes detecting a presence of an external condition on at least one side of the vehicle and the adjusted threshold dictates application of a higher level of force than the default threshold.

* * * * *